(12) United States Patent
Nakajima et al.

(10) Patent No.: US 6,223,424 B1
(45) Date of Patent: May 1, 2001

(54) METHOD FOR SLIDING A SEAL WITH A LIP ONTO A SHAFT, METHOD FOR UNCURLING THE LIP, AND APPARATUS FOR SLIDING THE SEAL THEREONTO

(75) Inventors: Mitsuru Nakajima, Atsugi; Motoi Hiramatsu, Sagamihara, both of (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 09/255,011

(22) Filed: Feb. 22, 1999

Related U.S. Application Data

(62) Division of application No. 08/991,861, filed on Dec. 16, 1997.

(30) Foreign Application Priority Data

| Dec. 16, 1996 | (JP) | 8-353700 |
| Feb. 24, 1997 | (JP) | 9-057051 |
| Feb. 24, 1997 | (JP) | 9-057054 |
| Dec. 9, 1997 | (JP) | 9-339117 |
| Dec. 9, 1997 | (JP) | 9-339118 |
| Dec. 9, 1997 | (JP) | 9-339119 |
| Dec. 9, 1997 | (JP) | 9-339120 |

(51) Int. Cl.$^7$ ................................................. B23P 21/00
(52) U.S. Cl. ...................... 29/717; 277/311; 277/630; 29/235; 29/240; 29/450; 29/789
(58) Field of Search ................... 277/356, 634, 277/572, 630, 309, 311, 315, 551, 571; 29/450, 277, 235, 240, 434, 783, 717, 789; 384/477

(56) References Cited

U.S. PATENT DOCUMENTS 3,393,440 * 7/1968 Wilson .
3,686,741 * 8/1972 Williams et al. ................. 29/789
3,773,336 * 11/1973 Walter et al. .
4,611,931 * 9/1986 Brandenstein .
5,008,994 * 4/1991 Rettig et al. .
5,014,417 * 5/1991 Saito et al. ........................ 29/783
5,820,132 * 10/1998 Marnot .

FOREIGN PATENT DOCUMENTS

| 4-76331 | 7/1992 | (JP) . |
| 6-30565 | 4/1994 | (JP) . |
| 3-007446 | 11/1994 | (JP) . |

* cited by examiner

*Primary Examiner*—S. Thomas Hughes
*Assistant Examiner*—Steve Blount
(74) *Attorney, Agent, or Firm*—Oblon, Spivak, McClelland, Maier & Neustadt, P.C.

(57) ABSTRACT

When a seal (10) with a lip (10A) is slid onto a shaft (14), the seal (10) is first slid from a D-cut portion (14C) to the end of a shaft body (14B) contiguous to the D-cut portion (14C), and then is slid at a first speed (at 40 mm/s) from this end to a position in which the seal (10) does not come into contact with a large-diameter portion (14A) of the shaft (14). Since there is a strong possibility that the lip (10A) of the seal (10) will have been completely curled at this time. the seal (10) is pulled out at a second speed (at 10 mm/s) on the shaft body (14B) from this position toward the D-cut portion (14C), and the seal (10) is again slid inward at a third speed (at 70 mm/s) from this position to an appropriate position. Thus, the seal (10) is slid without the lip (10A) being curled. The sliding operations at the second and third speeds may be performed a plurality of times. Another way of sliding the seal (10) without the lip (10A) being curled is to slide the seal (10) onto the shaft (14) while rotating the shaft (14) and the seal (10) relatively with each other. Additionally, if the shaft (14) and the seal (10) are rotated relatively with each other while positioning the seal (10) at the D-cut portion (14C), the lip (10A) can be uncurled.

51 Claims, 26 Drawing Sheets

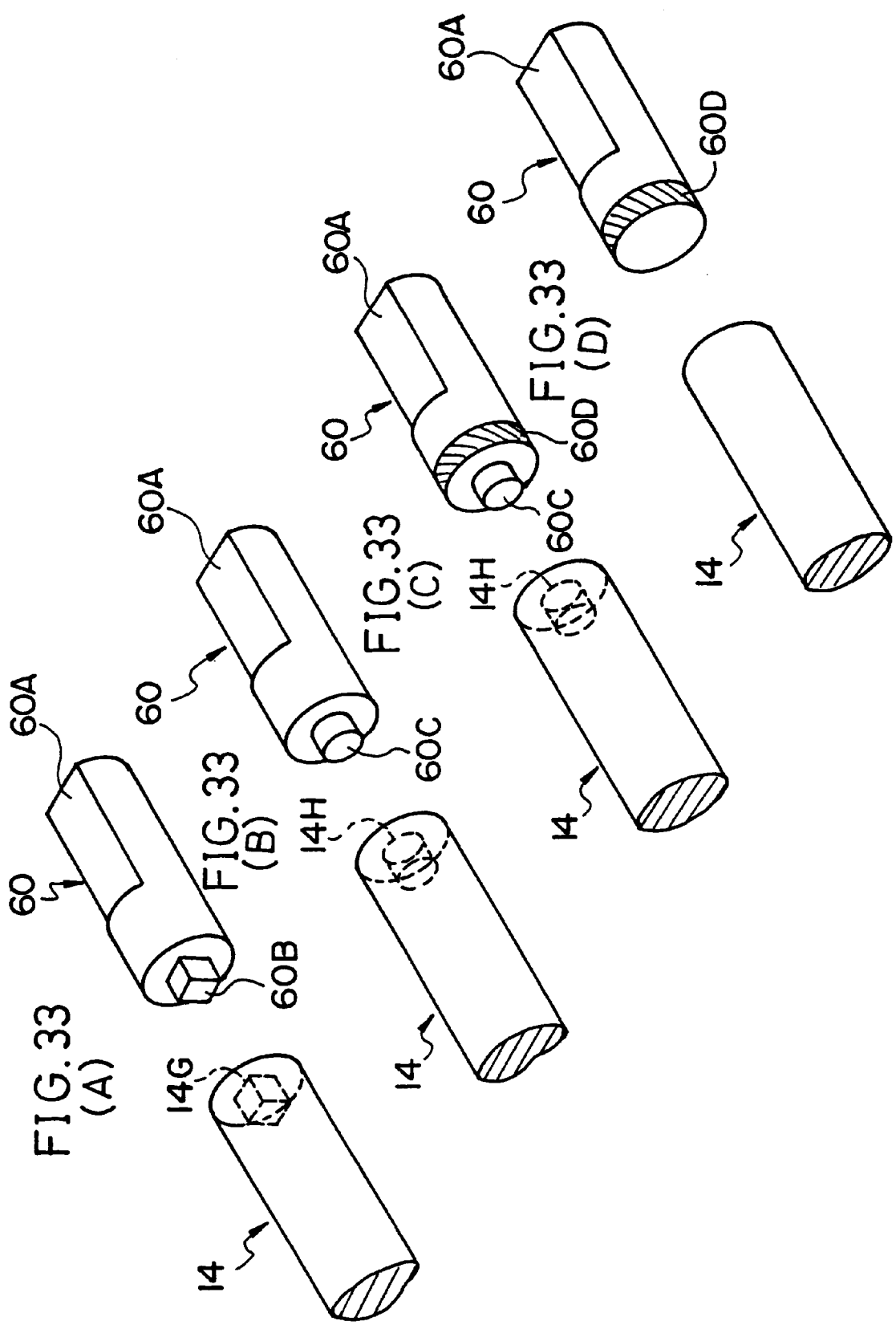

METHOD FOR SLIDING A SEAL WITH A LIP ONTO A SHAFT, METHOD FOR UNCURLING THE LIP, AND APPARATUS FOR SLIDING THE SEAL THEREONTO

This application is a division of U.S. application Ser. No. 08/991,861, filed Dec. 16, 1997.

BACKGROUND OF THE INVENTION

1. Field of the Invention

This invention relates to a method for sliding a seal with a lip, such as an oil seal or G seal, onto a shaft, a method for recovering the curl of the lip occurring when the seal is slid onto the shaft, and an apparatus for sliding the seal onto the shaft.

2. Description of the Related Art

Conventionally, a seal with a funnel-shaped lip is known. The lip projects toward the inner circumference of an annular body of the seal. In this seal, the end of the lip which is formed of an elastic member, such as rubber, is in direct contact with a shaft, so that the content (oil or ponder) inside the seal can be prevented from leaking outside and, at the same time, foreign objects (dust or the like) can be prevented from invading inside of the seal from the outside.

When the seal is slid onto the cylindrical shaft, which is a corresponding part to be incorporated with the seal, in a state in which the front end of the lip is directed toward the shaft, there is a case in which the lip is turned inward or is curled inside of the seal. This case makes it impossible to prevent the leakage of the content to the outside and prevent the invasion of the foreign objects through the seal.

For this reason, an apparatus has been proposed for sliding a seal with a lip onto a shaft without inverting or curling the lip in such a way that a pipe-like member is inserted in the seal in advance and, in this state, the seal is slid onto the shaft and there after the pipe-like member is pulled away from the seal (see Japanese Utility Model Application Early Laid-Open Publication No. Hei 4-76331, for example). Also, a seal with a lip has been proposed which is provided with a spring for pressing the seal so as not to curl the lip when sliding the seal onto a shaft (see Japanese Utility Model Application Early Laid-Open Publication No. Hei 6-30565, for example).

There is also a method for detecting whether a lip of a seal has been curled. For example, in Japanese Registered Utility Model No. 3007446, a method is proposed which includes the steps of forming a notch in the circumferential edge of a seal with a lip and making an air-leakage test in order to easily detect whether the lip of the seal has been curled.

In the aforementioned apparatus disclosed by Japanese Utility Model Application Early Laid-Open Publication No. Hei 4-76331, a mechanism for inserting the pipe-like member into the seal is also required in addition to a mechanism for sliding the seal onto the shaft. Therefore, disadvantageously, the apparatus requires a larger space, and an inserting operation must be carried out twice. As a result, the structure of the apparatus becomes complicated. In the aforementioned seal disclosed by Japanese Utility Model Application Early Laid-Open Publication No. Hei 6-30565, the seal is provided with an annular portion to which a garter sprint is attached to prevent the lip from curling. This makes the structure of the seal unique and complicated.

In the aforementioned method disclosed by Japanese Registered Utility Model No. 3007446, a device for supplying air is inevitably required to make the air-leakage test. As a result, large-sized assembly equipment is required, and thus equipment costs are raised.

Further, the prior art methods and apparatus mentioned above are each proposed from only the viewpoint of sliding the seal onto the shaft so that the lip is not turned inward or is not curled. In other words, the methods and apparatus pay no attention to uncurling the lip which has been curled.

SUMMARY OF THE INVENTION

It is a first object of this invention to provide a method for precisely sliding a seal onto a shaft without using a large apparatus space for the seal sliding, a peculiar structure of the seal, and an air-leaking test or the like, and an apparatus for sliding the seal by the seal-sliding method.

It is a second object of this invention to provide a method for easily returning a curled seal lip into the initial state in the case where a lip is curled when a seal is slid, and an apparatus for sliding the seal by the curled-seal-lip-returning method.

In order to achieve the first object, the seal-sliding method according to this invention comprises the step of sliding a seal while the shaft is rotated around the axial line of a shaft when the seal with a lip is slid onto the shaft (according to an aspect of this invention). Further, the apparatus for realizing the step of the seal-sliding method according to this invention, that is, the seal-sliding apparatus for sliding the seal with the lip onto the shaft, comprises a holding means for holding releasably the seal in the direction of the axial line of the shaft, and a shaft-rotating means for rotating the shaft, wherein the seal is slid onto the shaft while the shaft is rotated around the axial line by the shaft-rotating means (according to another aspect of this invention).

According to one of the two aspects mentioned above of this invention, since the shaft and the lip make friction in a rotational direction with each other when the shaft is rotated, the frictional resistance of the seal-sliding direction becomes lower, so that the lip can be prevented from being curled by the frictional force of the seal-sliding direction.

Further, in order to attain the first object, the seal-sliding method according to this invention comprises the step of sliding a seal while the seal is rotated around the axial line of a shaft when the seal with a lip is slid onto the shaft (according to another aspect of this invention). Further, the apparatus for realizing the step of the seal-sliding method according to this invention, that is, the seal-sliding apparatus for sliding the seal with the lip onto the shaft, comprises a holding means for holding releasably the seal in the direction of the axial line of the shaft, and a seal-rotating means for rotating the seal which is held by the holding means, wherein the seal is slid onto the shaft while the seal is rotated around the axial line of the shaft by the seal-rotating means (according to another aspect of this invention).

According to one of the two aspects mentioned above of this invention, since the shaft and the lip make friction in a rotational direction with each other when the seal is rotated, the same function as the function obtained when the shaft is rotated can be obtained. Further, the construction according to one of these two aspects is more effective in the case where the shaft cannot be rotated.

Further, in order to attain the first object, the seal-sliding method according to this invention comprises the step of sliding a seal while a shaft and the seal are rotated together around the axial line of the shaft when the seal with a lip is slid onto the shaft (according to another aspect of this invention). Further, the apparatus for realizing the step of the seal-sliding method according to this invention, that is, the seal-sliding apparatus for sliding the seal with the lip onto the shaft, comprises a holding means for holding releasably the seal in the direction of the axial line of the shaft, a seal-rotating means for rotating the seal which is held by the holding means, and a shaft-rotating means for rotating the shaft, wherein the seal is rotated by the seal-rotating means and the seal is slid onto the shaft while the shaft is rotated by the shaft-rotating means (according to another aspect of this invention).

According to one of the two aspects mentioned above of this invention, since the shaft and the lip make friction in a rotational direction with each other when the seal and the shaft are rotated. The same function as the function obtained when either the shaft or the seal is rotated can be obtained.

Further, in order to attain the first object, the seal-sliding method according to this invention comprises the steps of making a first operation in which a seal with a lip is at first slid onto a shaft, then making a second operation in which the seal is slid back to a position where the seal cannot be slid away from the shaft after the first operation, and making a third operation once or many times in which the seal is slid again onto the shaft after the third operation (according to another aspect of this invention). Further, the apparatus for realizing the steps of the seal-sliding method according to this invention, that is, the seal-sliding apparatus for sliding the seal with the lip onto the shaft, comprises a holding means for sliding and holding the seal onto the shaft, and a controlling means for controlling the holding means so that the first operation in which the seal is at first slid onto the shaft is made, then the second operation in which the seal is slid back to the position where the seal cannot be slid away from the shaft after the first operation is made, and the third operation in which the seal is slid again onto the shaft after the second operation is made once or many times (according to another aspect of this invention).

According to one of the two aspects mentioned above of this invention, following, the first operation of sliding the seal, the second operation of sliding the seal back is made, so that the seal which has been curled in the first operation can be returned into the initial state by the frictional force caused in the second operation where the seal lip makes friction with the shaft. Then, the seal in the initial state is slid again in the third operation, so that the seal can be slid onto the shaft so that the lip is not curled.

Next, in order to attain the second object, the curled-lip-recovering method, that is, a method for returning a lip which has been curled into the initial state when a seal with the lip is slid onto a shaft according to this invention comprises the steps of cutting in advance a part of the outer circumferential surface of the shaft to form a cut portion, positioning the seal in the cut portion when the seal is slid and at least a part of the lip is curled, and rotating the shaft relatively to the seal to returning the curled lip into the initial state (according to another aspect of this invention). Further, the apparatus for realizing the steps of the curled-lip-recovering method according to this invention, that is, the seal-sliding apparatus for sliding the seal with the lip onto the shaft, comprises a first means for curling at least the part of the lip when the seal is slid, a second means for positioning the seal in the cut portion formed in the outer circumferential surface of the shaft and rotating the shaft relatively to the seal to returning the lip which has been curled by the first means into the initial state, and a third means for keeping the seal whose lip has been brought into the initial state in a predetermined position (according to another aspect of this invention).

According to one of the two aspects mentioned above of this invention if only the shaft would be rotated relatively to the seal when the seal is slid onto the shaft and the lip is curled, the curled lip can be easily returned into the initial state. As a result, the seal whose lip has been brought into the initial state can be slid in the predetermined position of the shaft as it is.

Further, in order to attain the second object, the curled-lip-recovering method, that is, a method for returning a lip which has been curled into the initial state when a seal with the lip is slid onto a shaft according to this invention comprises the step of positioning the seal in a circumferential groove formed in the outer surface of the shaft so that the curled lip is returned into the initial state (according to another aspect of this invention). Further, the apparatus for realizing the steps of the curled-lip-recovering method according to this invention, that is, the seal-sliding apparatus for sliding the seal with the lip onto the shaft, comprises a curled-lip-recovering means for positioning the seal in the circumferential groove formed in the outer surface of the shaft and returning the curled lip into the initial state (according to another aspect of this invention).

According to one of the two aspects mentioned above of this invention, if only the seal would be positioned in the circumferential groove, the curled lip can be returned into the initial state by the recovering force of the lip. In the case where the curled lip is returned into the initial state even though the seal is positioned in the circumferential groove, when the shaft is rotated relatively to the seal in a state where the seal is positioned in the circumferential groove, the curled lip can be returned into the initial state without any failure.

Further, in order to attain the second object, the curled-lip-recovering method, that is, a method for returning a lip of a seal which has been curled into the initial state when the seal with the lip is slid onto a shaft according to this invention comprises the steps of connecting a jig member having a cut portion into which a part of the outer circumferential surface has been cut and the shaft on the central axis of the shaft, rotating the jig member relatively to the seal when the seal is positioned in the cut portion, and returning the curled lip into the initial state (according to another aspect of this invention). Further, the apparatus for realizing the steps of the curled-lip-recovering method according to this invention, that is, the seal-sliding apparatus for sliding the seal with the lip onto the shaft, comprises a curled-lip-recovering means for connecting the jig member having the cut portion into which the part of the outer circumferential surface has been cut to the shaft on the central axis, rotating the jig member relatively to the seal when the seal is positioned in the cut portion, and returning the curled lip into the initial state (according to another aspect of this invention).

According to one of the two aspects mentioned above of this invention, the curled lip can be returned into the initial state with the cut portion formed in the jig member, which is effective in the case where the cut portion cannot be formed in the shaft.

Further, in order to attain the second object, the curled-lip-recovering method, that is, a method for returning a lip of a seal which has been curled into the initial state when the seal with the lip is slid onto a shaft according to this invention comprises the steps of connecting a jig member having a circumferential groove in the outer circumferential surface and the shaft on the central axis of the shaft, positioning the seal at the cut portion, and returning the curled lip into the initial state (according to another aspect of this invention). Further, the apparatus for realizing the steps of the curled-lip-recovering method according to this invention, that is, the seal-sliding apparatus for sliding the seal with the lip onto the shaft, comprises a curled-lip-recovering means for connecting the jig member having a circumferential groove in the outer circumferential surface and the shaft on the central axis of the shaft, positioning the seal in the circumferential groove, and returning the curled lip into the initial state (according to another aspect of this invention).

According to one of the two aspects mentioned above of this invention, the curled lip can be returned into the initial state with the circumferential groove formed in the jig member, which is effective in the case where the circumferential groove cannot be formed in the shaft.

BRIEF DESCRIPTION OF THE DRAWINGS

FIG. 33(A) is a perspective view of a jig member having a square-pillar portion and a shaft having a square-pillar-shaped hole, showing a method for connecting the jig member with the shaft.

FIG. 33(B) is a perspective view of a jig member having a cylindrical portion and a shaft having a cylindrical hole, showing a method for connecting the jig member with the shaft.

FIG. 33(C) is a perspective view of a jig member having a cylindrical portion and a magnet portion and a shaft having a cylindrical hole, showing a method for connecting the jig member with the shaft.

FIG. 33(D) is a perspective view of a jig member having a magnet portion and a shaft, showing a method for connecting the jig member with the shaft.

DETAILED DESCRIPTION OF THE EMBODIMENT

An embodiment of the present invention will be hereinafter described with reference to the accompanying drawings.

Figure 1:
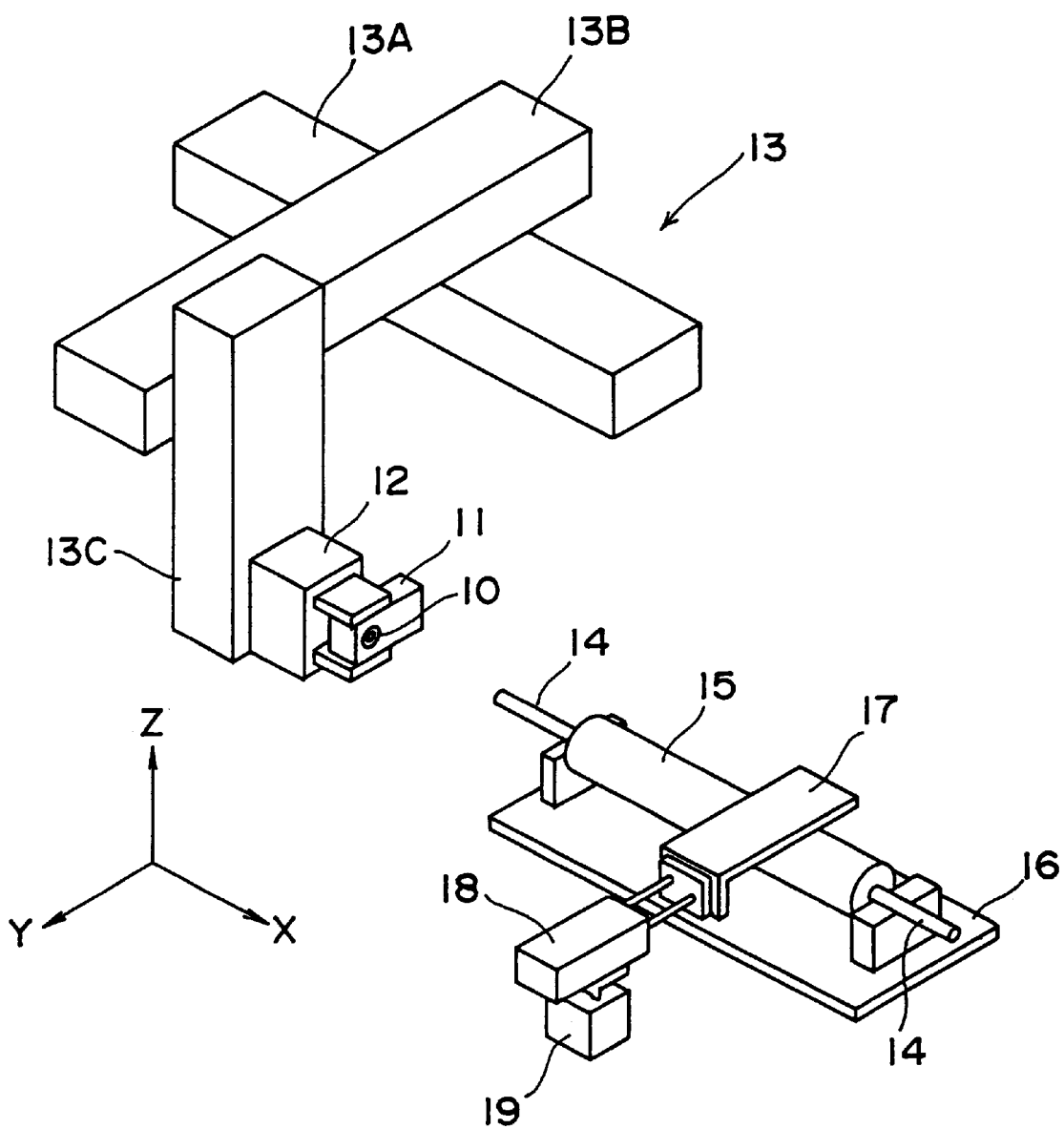
FIG. 1 is a schematic perspective view of an apparatus for sliding a seal onto a shaft while the shaft is rotated.

FIG. 1 is a schematic perspective view of an apparatus for sliding a seal. In FIG. 1, reference character 10 designates a seal with a lip, which is held by a holding member 11. The holding member 11 is held by a chuck hand 12, and the seal 10 is held indirectly by the chuck hand 12. Naturally, the seal 10 may also be held directly by the chuck hand 12 without the holding member 11 therebetween.

The chuck hand 12 is attached to a robot 13 and can make a forward-and-backward motion in the directions of X, Y, and Z shown in FIG. 1. The robot 13 comprises a first member 13A disposed in the X-direction, a second member 13B disposed in the Y-direction, and a third member 13C disposed in the Z-direction. Each of the second member 13B, the third member 13C, and the chuck hand 12 makes a forward-and-backward motion in the X-direction along the first member 13A, in the Y-direction along the second member 13B, and in the Z-direction along the third member 13C, respectively. Herein, according to this embodiment, the robot having three axes is shown as an example, however, a robot having an axis or two axes may also be used. Further, instead of the type of perpendicular lines, a robot in a scalar type or polar-coordinate type may also be used.

In FIG. 1, reference character 14 designates a shaft on which the seal 10 is slid, and the shaft 14 is attached to both end surfaces of a columnar or cylindrical member 15. This member 15 is disposed rotatable on an operational stand 16, and a turnable plate 17 is disposed above the member 15. One end of the turnable plate 17 is connected to a first cylinder 18, and the first cylinder 18 is held on a second cylinder 19 The turnable plate 17, the first cylinder 18, and the second cylinder 19 are mechanisms for transmitting the rotational force to the member 15.

In the seal-sliding apparatus, when the seal 10 is slid onto the shaft 14, the holding member 11 is held by and between the chuck hand 12, and the first cylinder 18 is pulled down by the second cylinder 19. The first cylinder 18 is pulled down, so that the turnable plate 17 can be pressed onto a part of the outer circumferential surface of the member 15. Thereafter, when the first cylinder 18 allows the turnable plate 17 to make a forward-and-backward motion in the Y-direction, the member 15 repeats a right or reversal rotational motion together with the shaft 14. Then, the chuck hand 12 is moved in the Y- or Z-direction by the drive of the robot 13, the center of the seal 10 held on the holding member 11 corresponds to the central axis of the shaft 14, the chuck hand 12 is moved in the X-direction, the seal 10 comes close to the axial end of the shaft 14. and thus the seal 10 is slid onto the shaft 14 which is making the right or reversal rotational motion.

At this time, the shaft 14 makes a frictional rotation with the lip of the seal 10, so that the friction in the seal-sliding direction can be made smaller. Further, the distance at which the chuck hand 12 is moved in the X-direction is regulated, so that the seal 10 which is slid onto the shaft 14 can be brought to a predetermined position.

Figure 2:
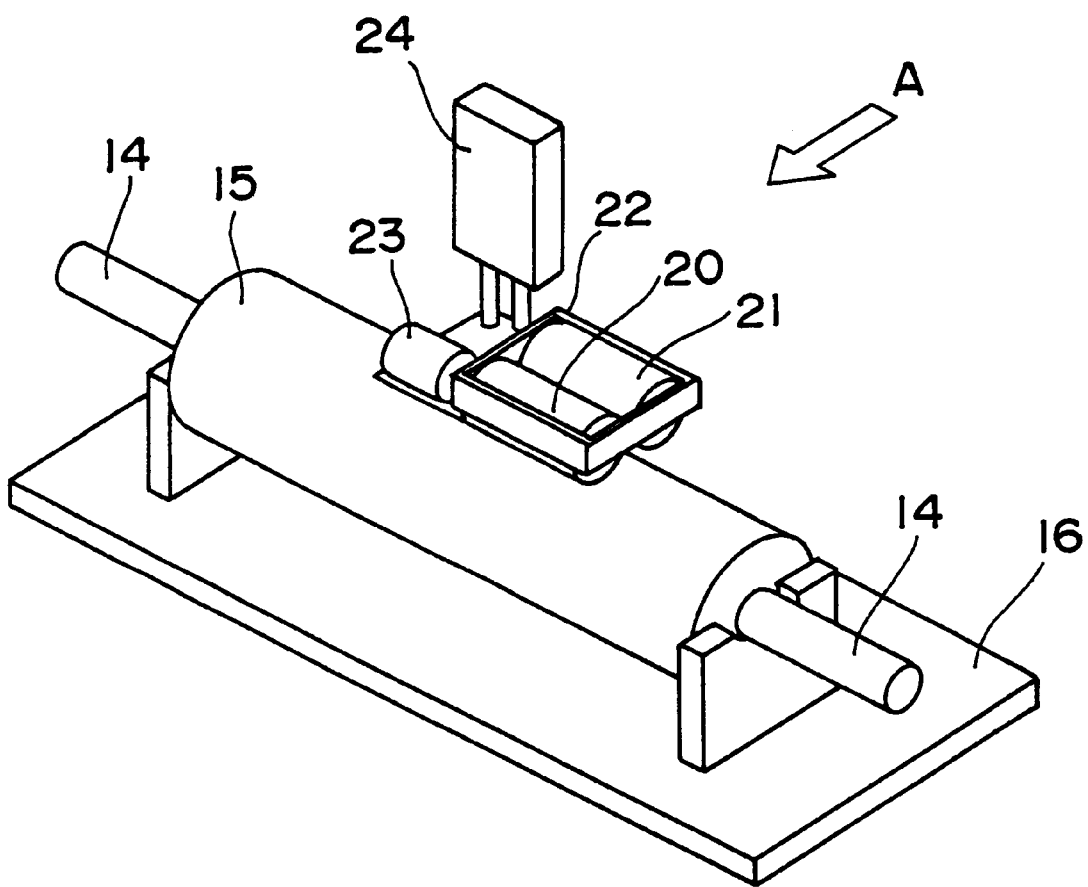
FIG. 2 is a schematic perspective view of another example of a mechanism for transmitting the rotating force.

FIG. 2 is a schematic perspective views of another mechanism for transmitting the rotating force. In this example, a rotating roller 20 and a rotated roller 21 are disposed above and in parallel with the member 15. The rotating roller 20 and the rotated roller 21 are disposed rotatably inside of a holding body 22, and a part of the circumferential surface of the rotating roller 20 and one of the rotated roller 21 are in contact with each other. When a motor 23 which is attached to the holding body 22 and is connected to the rotating roller 20 is rotated, the rotating roller 20 and the rotated roller 21 are rotated in the reversal directions for each other. A cylinder 24 is connected to the holding body 22.

When the seal 10 is slid onto the shaft 14, the holding body 22 is pressed downward with the cylinder 24, the rotating roller 20 is pressed onto the outer circumferential surface of the member 15, the revolving force of the motor 23 is transmitted to the member 15 via the rotating roller 20, and the member 15 is rotated together with the shaft 14. In the case where the member 15 is reversely rotated, the holding body 22 is moved in the A-direction with a cylinder (not shown), and the rotated roller 21 comes into contact with the outer circumferential surface of the member 15. Herein, when either the rotating roller 20 or the rotated roller 21 is used, the shaft 14 can be continuously rotated in one direction.

In the rotating-force-transmitting mechanism shown in FIG. 2, the outer circumferential surface of the rotating roller 90 and that of the rotated roller 21 are in contact with each other and are rotated in the reversal directions for each other. However, a space may be left between the rotating roller 20 and the rotated roller 21 so that only the rotating roller 20 is rotated by the revolving force of the motor 23. According to this construction, when the holding body 22 is pressed downward, both of the rotating roller 20 and the rotated roller 21 simultaneously come into contact with the outer circumferential surface of the member 15, so that the rotating roller 20, the rotated roller 21, and the member 15 can be rotated in a stable state. Herein, in this case, if the motor 23 is reversely revolved, the member 15 is reversely rotated.

Figure 3:
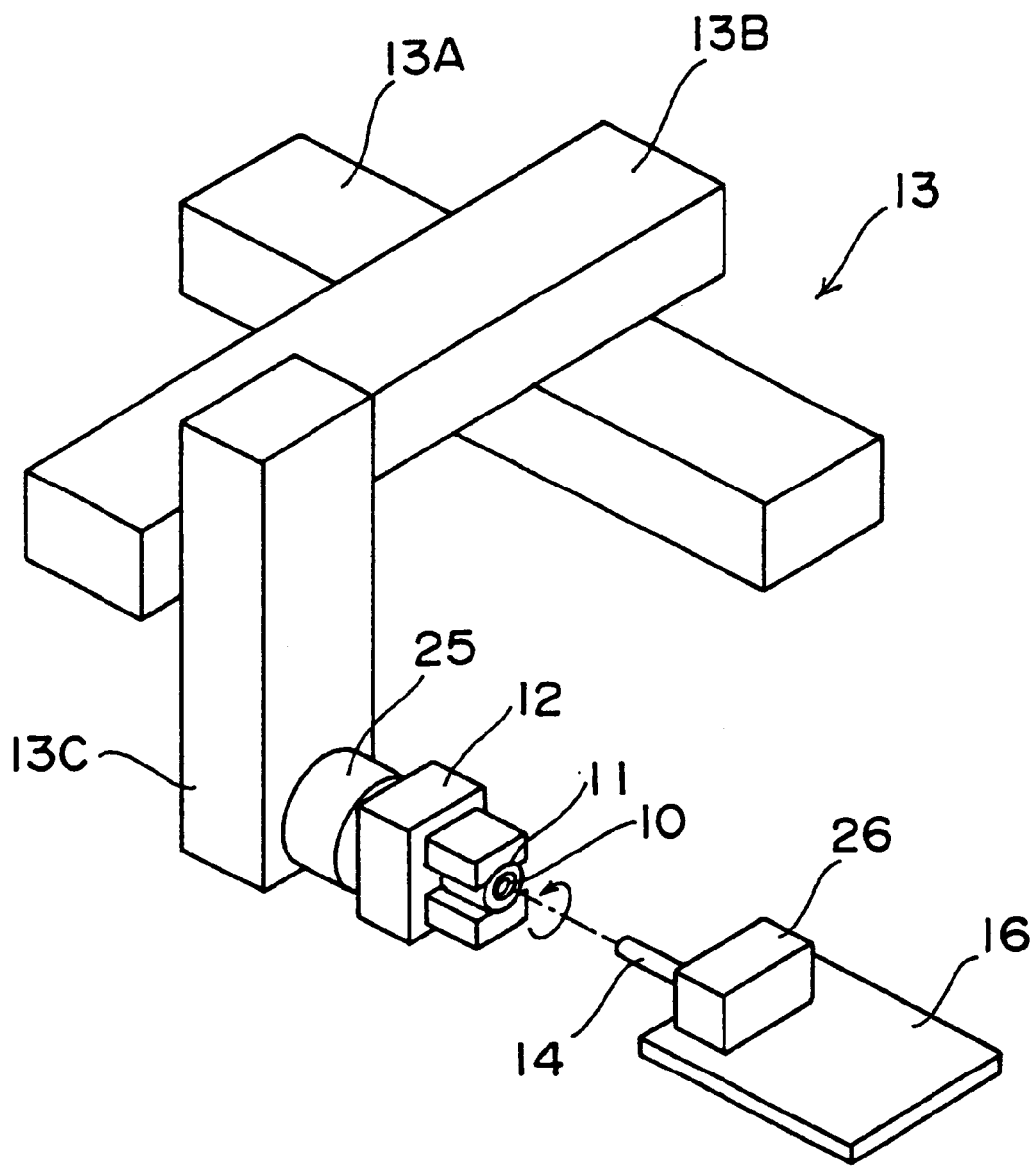
FIG. 3 is a schematic perspective view of a seal-sliding apparatus for sliding a seal onto a shaft while the seal is rotated.

Although the mechanisms shown in FIGS. 1 and 2 are constructed so that the member is rotated, there can also be considered a mechanism which is constructed so that the member is not rotated. Such a mechanism is constructed so that the seal is rotated. FIG. 3 shows this example. In FIG. 3, the chuck hand 12 is connected to the robot 13 via a rotating mechanism 25. The rotating mechanism 25 can be rotated in one direction and in the reversal direction, and the chuck hand 12 is also rotated in the right or reversal direction according to the right and reversal rotations. Herein, a member 26 mounted on the operational stand 16 has, for example, a square-pillar shape, so that it cannot be rotated. The shaft 14 is attached to the member 26.

When the seal 10 held on the holding, member 11 is slid onto the shaft 14, the robot 13 allows the center of the seal 10 to correspond to the central axis of the shaft 14 and sequently, the rotating mechanism 25 allows the seal 10 to rotate in the right or reversal direction so that the seal 10 is slid onto the shaft 14. At this time, in the same way as shown in FIG. 1 or 2, the shaft 14 makes a frictional rotation with the lip of the seal 10, so that the friction in the seal-sliding direction can be made smaller. Herein, a rotating mechanism be a motor or a rotary cylinder is desired to be used as the rotating mechanism 25.

Figure 4:
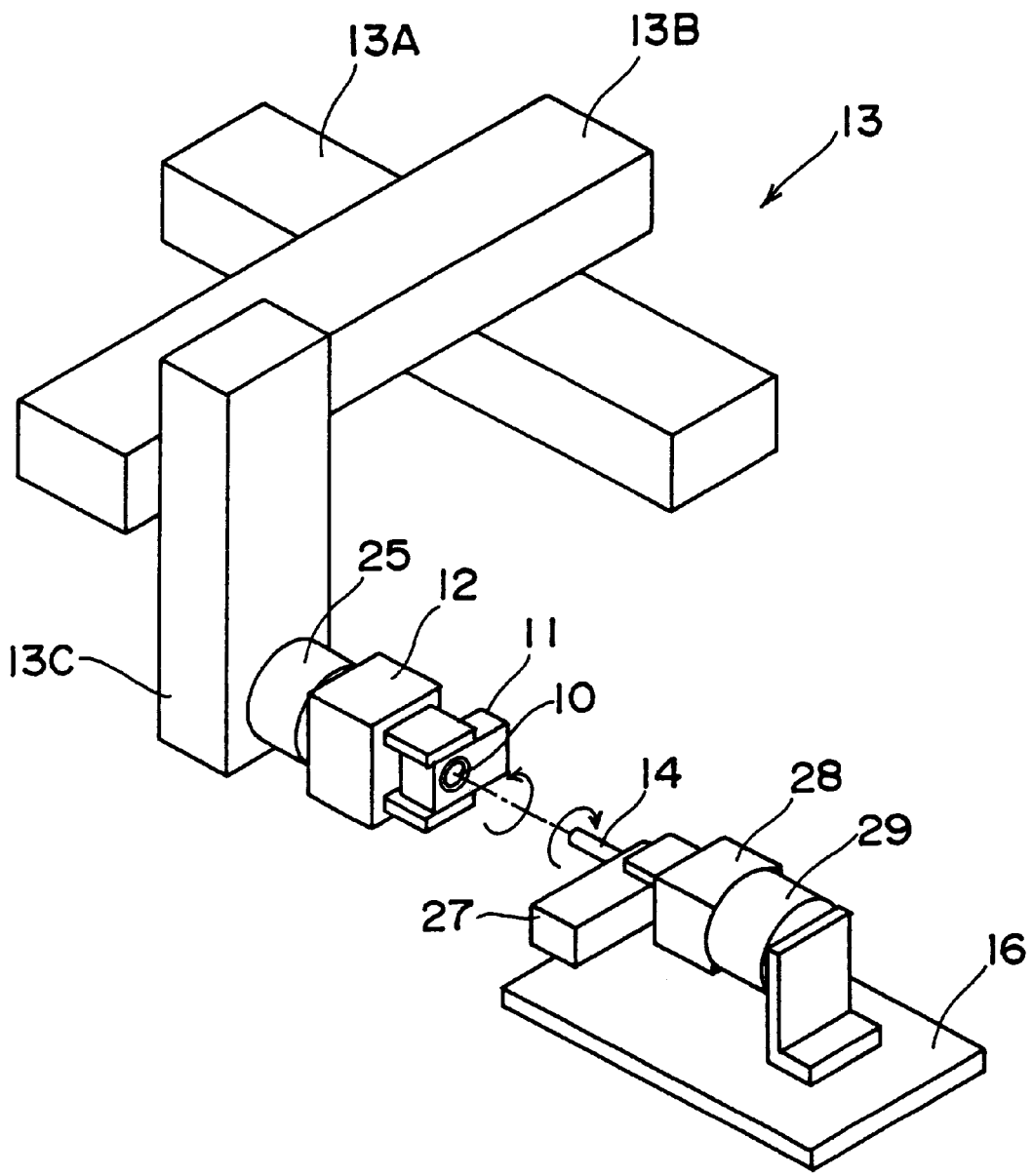
FIG. 4 is a schematic perspective view of a seal-sliding apparatus for sliding a seal onto a shaft while both of the seal and the shaft are rotated.

FIG. 4 shows an example of sliding a seal onto a shaft while both of a member and the shaft are rotated. In the example shown in FIG. 4, in the case where a member 27 mounted on the operational stand 16 is not directly rotated, both of the seal 10 and the member 27 are rotated. In the same way as shown in FIG. 3, the chuck hand 12 is connected to the robot 13 via the rotating mechanism 25. The member 27 is held by and between a chuck hand 28, and the chuck hand 28 is fixed on the operational stand 16 via a rotating mechanism 29. The shaft 14 is attached to the member 27.

When the seal 10 is slid onto the shaft 14, the member 27 is rotated by the drive of the rotating mechanism 29, as well as the chuck hand 12 is rotated by the drive of the rotating mechanism 25. In brief, the seal 10 is slid onto the shaft 14 while the seal 10 and the shaft 14 are each rotating. At this time, the shaft 14 makes a frictional rotation with the lip of the seal 10, so that the friction in the seal-sliding direction can be made smaller. Herein, a rotating mechanism by a motor or a rotary cylinder is desired to be used as the rotating mechanism 29. In addition, it is preferable that the directions in which the rotating mechanisms 25, 29 are rotated are reverse to each other.

Next, there will be explained the construction of the robot 13 in detail.

Figure 5:
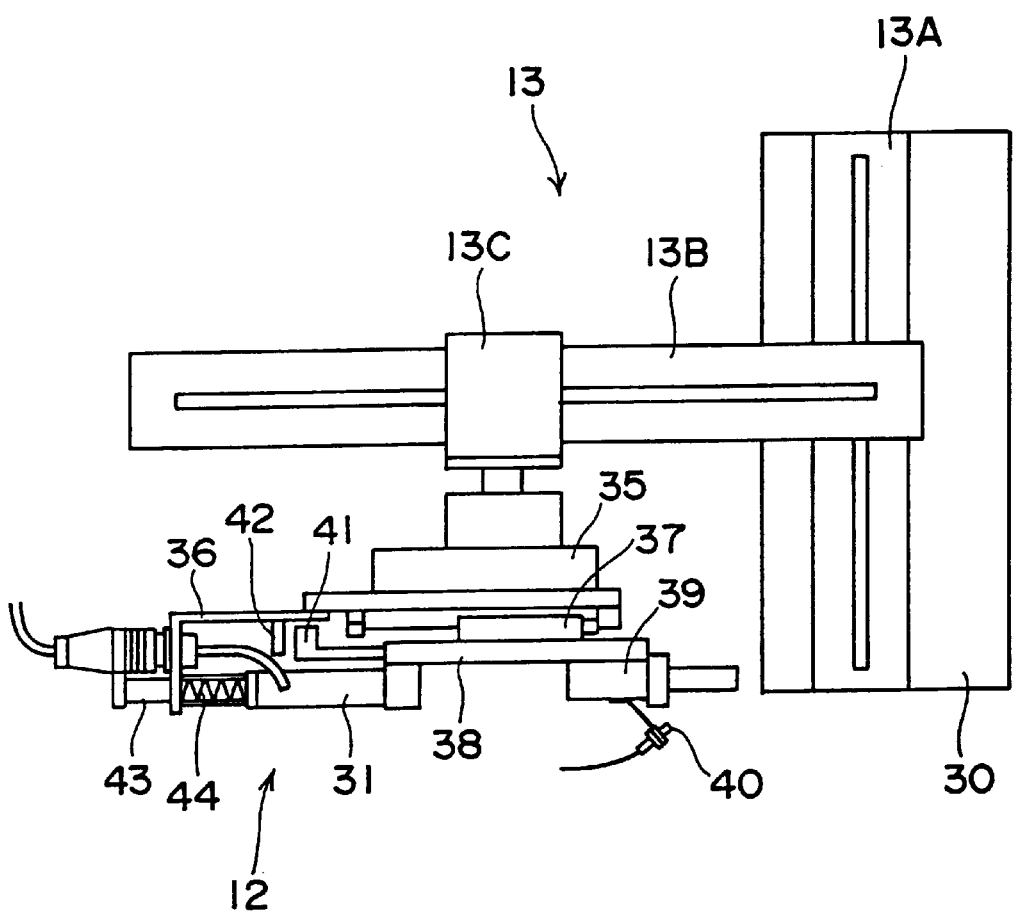
FIG. 5 is a plan view of a robot for sliding a seal.
Figure 6:
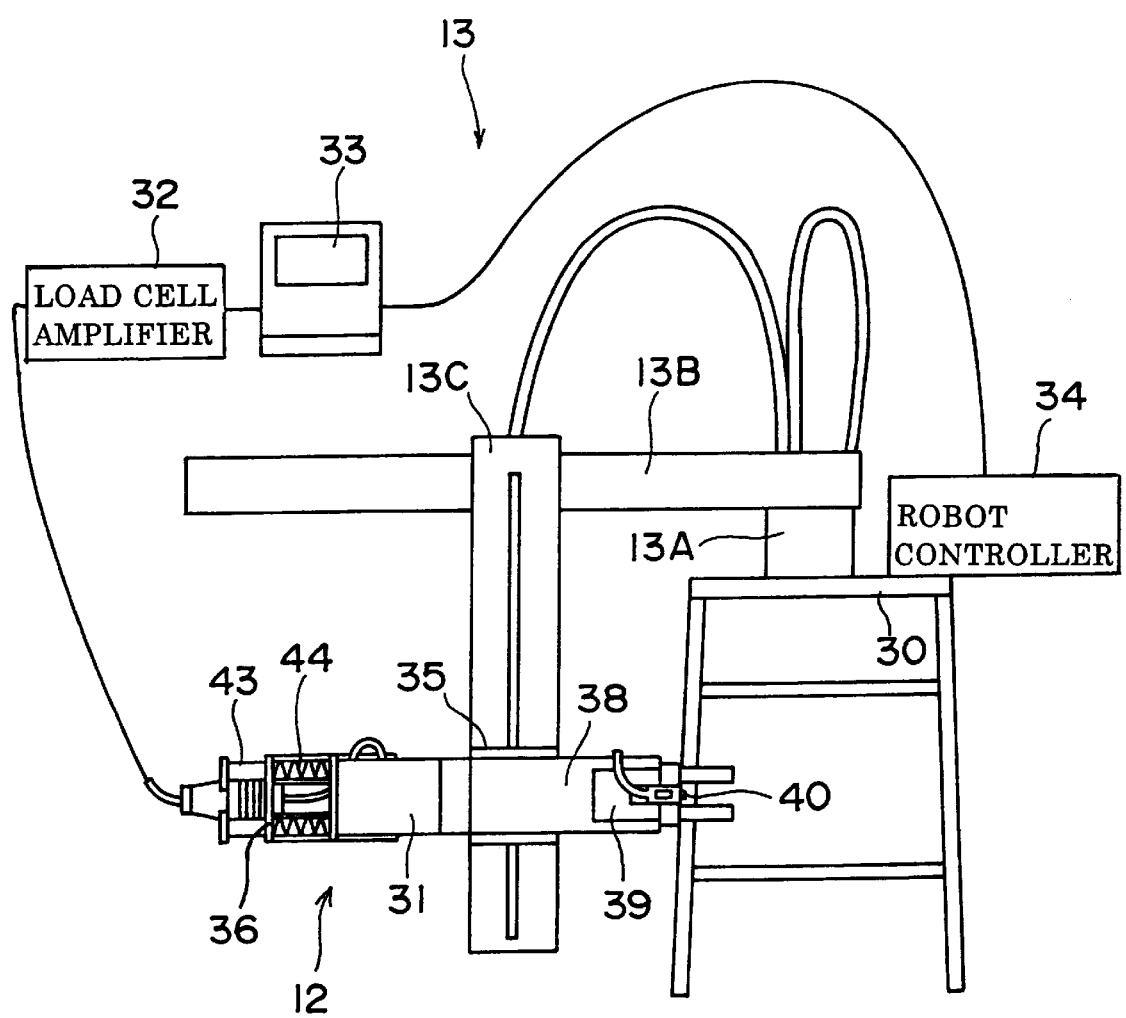
FIG. 6 is a side view of the robot shown in FIG. 5.

FIG. 5 is a plan view of the robot 13 and FIG. 6 is a side view of the robot 13. The robot 13 is mounted on an installment stand 30 and is positioned on the operational stand 16 (see FIG. 1 or 3). The chuck hand 12 includes a load cell 31. A detected signal (a detected load signal) in the load cell 31 is transmitted to a computer 33 via a load-cell amplifier 32. A robot controller 34 for controlling the operation of the robot 13 is disposed, and the robot controller 34 is connected to the computer 33 so that signals can be sent and received between the robot controller 34 and the computer 33.

Figure 7:
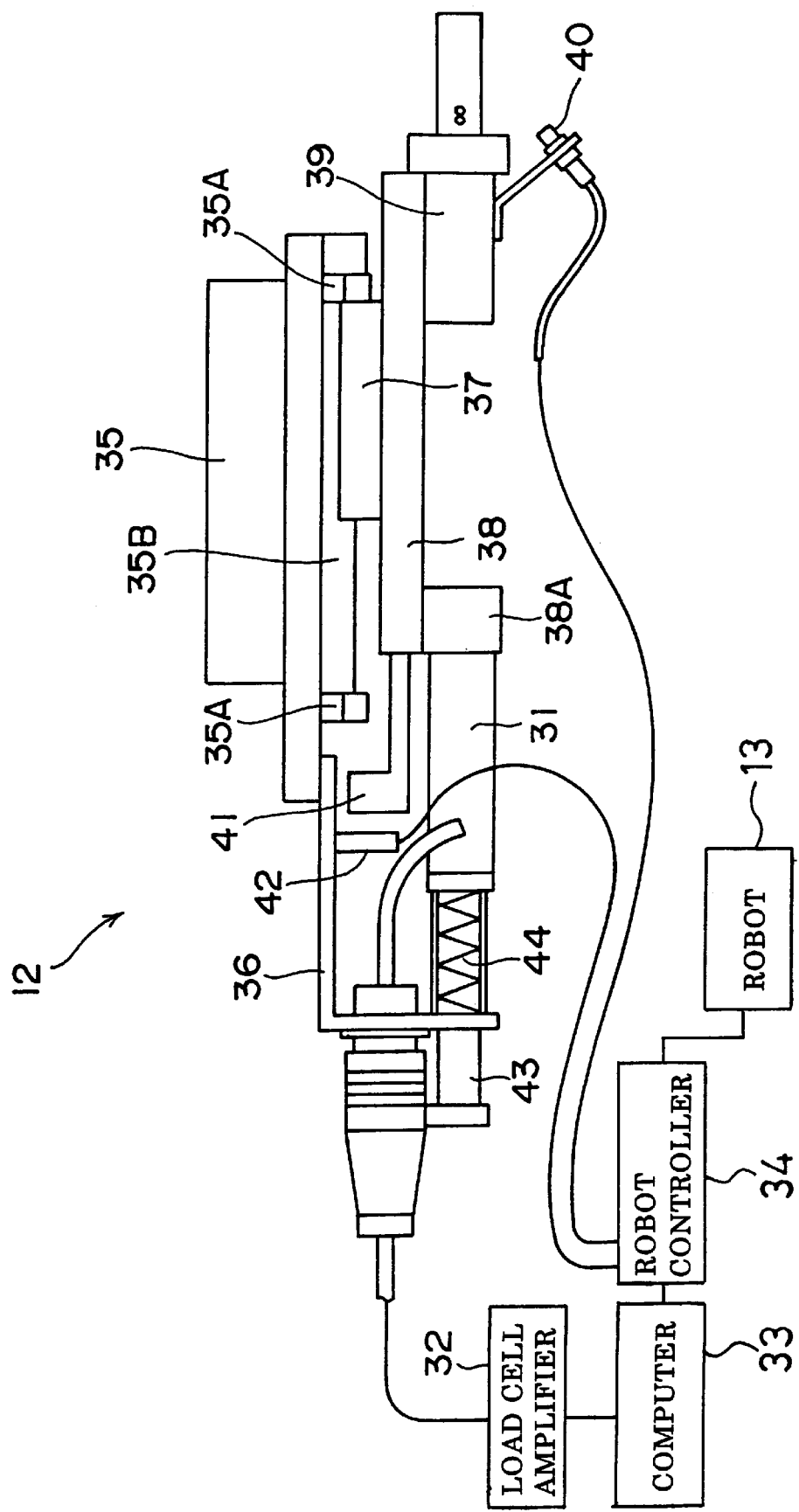
FIG. 7 is a plan view of a chuck hand.
Figure 8:
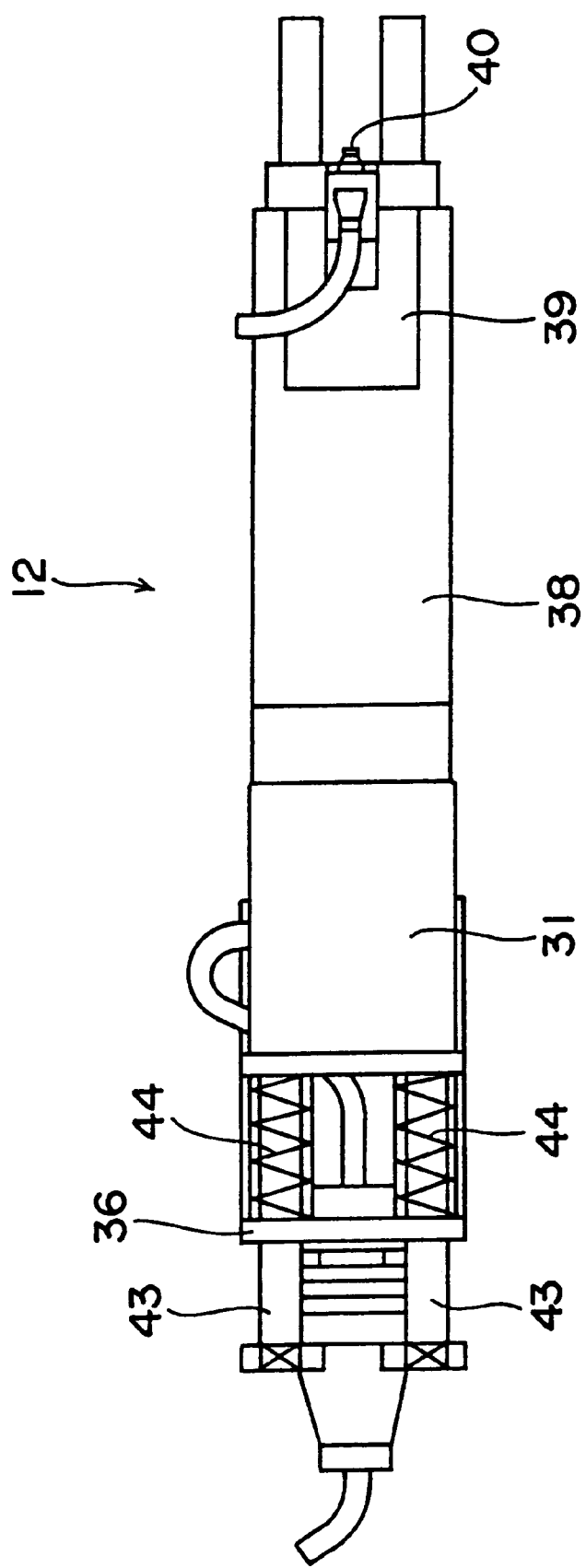
FIG. 8 is a side view of the chuck hand shown in FIG. 7.

FIG. 7 is a plan view of a chuck hand, showing its construction in detail, and FIG. 8 is a side view of the chuck hand. The chuck hand 12 is connected to a portion to which the hand of the robot 13 is attached via a base 35. Herein, the base 35 shown in FIG. 7 is used so that the chuck hand 12 is slid upward and downward (in the Z-direction) along the hand-attached portion of the robot 13. If the rotating mechanism 25 shown in FIGS. 3 and 4 is used in addition to the aforementioned construction, the chuck hand 12 can also be turned. According to this construction, the aforementioned operation can also be made even in the case where the direction in which the chuck hand 12 chucks the seal 10 or the holding member 11 (hereinafter, the seal or the holding member will be referred to as a seal), that is, the direction in which the seal is supplied, is different from the direction in which the seal is slid.

A bracket 36 which is kept curled in an L-shape is fixed on the back end (the left side and the right side correspond to the back side and the front side, respectively, in FIG. 7) of the base 35. A guide rail 35B having stoppers 35A at both ends thereof is attached to the plane in the substantially middle part of the base 35, and a sliding portion 37 is disposed slidably on the guide rail 35B. In short, the sliding portion 37 can be moved along the guide rail 35B in the right and left directions in FIG. 7 (in the direction in which the seal is slid).

A moving base 38 is fixed on the sliding portion 37. A chuck 39 between which the seal is held is attached to the front end of the moving base 38. A sensor 40 for detecting that the seal lies is attached to the chuck 39, and the seal-detecting sensor 40 can detect that the seal lies and inform the robot controller 34 of it.

A dog 41 for detecting a jam is attached to the back end of the moving base 38. When the moving base 38 is moved toward a direction of being away from a work (in the left direction in FIG. 7), the jam-detecting dog 41 comes across a sensor 42 for detecting the jam which is fixed on the bracket 36. The load cell 31 is fixed to the back end of the moving base 38 via an attachment block 38A.

Two axes 43 having a flange-shaped end are attached to the end opposite to the attachment block 38A of the load cell 31. Each axis 43 penetrates a hole formed in the bracket 36. A coil spring 44 is disposed between the end of the load cell 31 and the bracket 36. The axis 43 penetrates the coil spring 44, and a space is defined between the coil spring 44 and the axis 43 so that the coil spring 44 does not come into contact with the axis 43. While a seal-sliding operation is not made, the sliding portion 37 is pressed onto the stopper 35A closer to the chuck 39 by the force of the coil spring 44.

Figure 9:
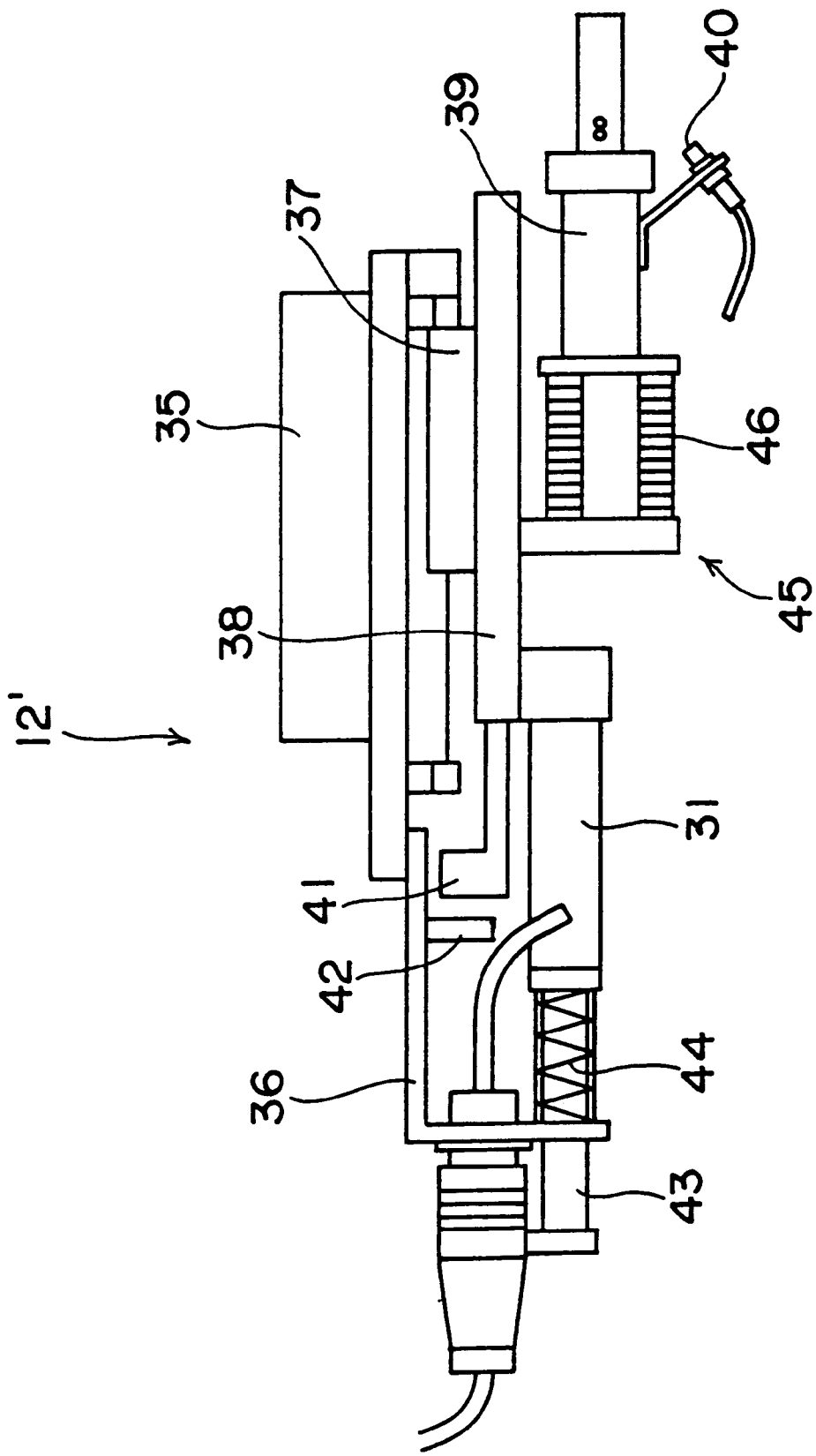
FIG. 9 is a plan view of another chuck hand.
Figure 10:
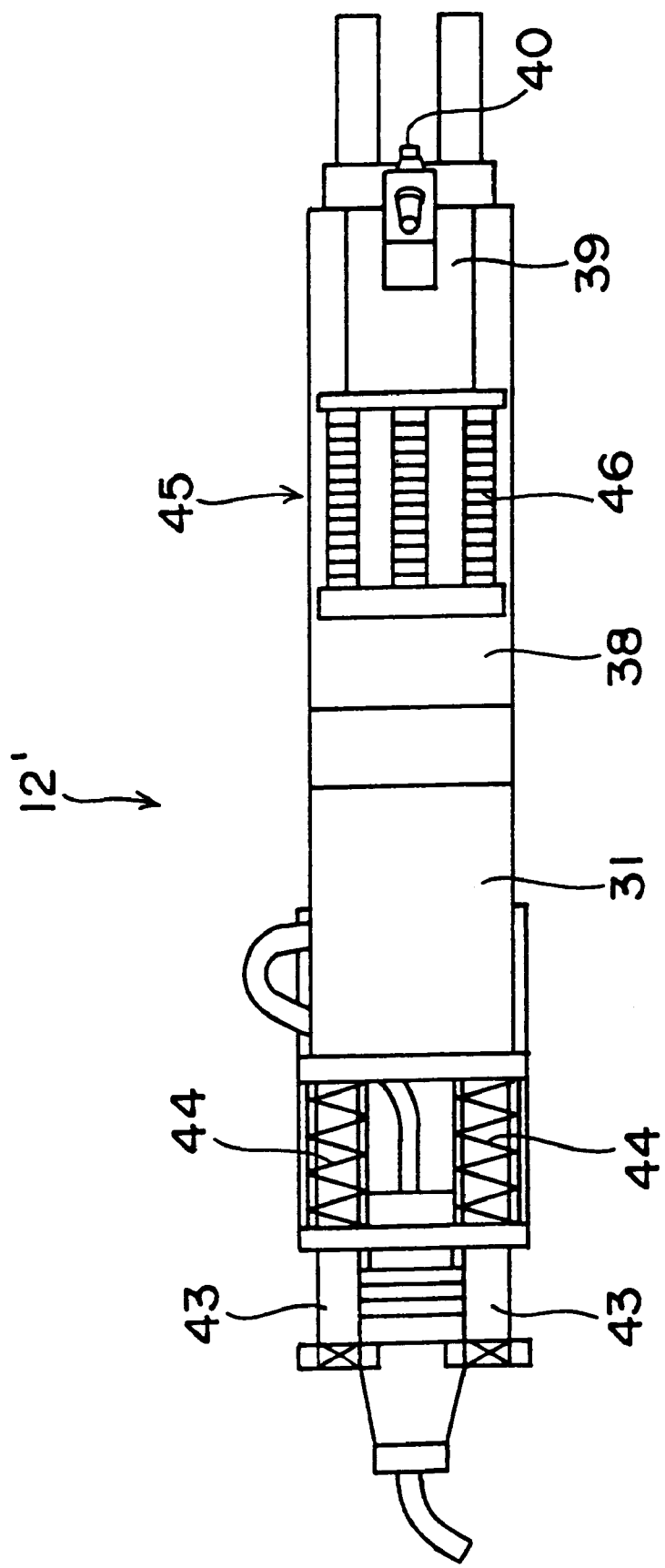
FIG. 10 is a side view of the chuck hand shown in FIG. 9.

FIG. 9 is a plan view of another chuck hand, and FIG. 10 is a side view of the chuck hand shown in FIG. 9. In a chuck hand 12' shown in FIGS. 9 and 10, a mechanism 45 for correcting the difference in position between the seal and the axis on which the seal is slid is disposed between the moving base 31 and the chuck 39. Although the correcting mechanism 45 is flexible in its radial direction, a plurality of members (three members in FIG. 10) 46 which is inflexible in the direction along the axial center of the correcting mechanism 45 are disposed in parallel in the correcting mechanism 45, so that the entire chuck 39 can be moved only in the radial direction of the axis on which the seal is slid.

Figure 11:
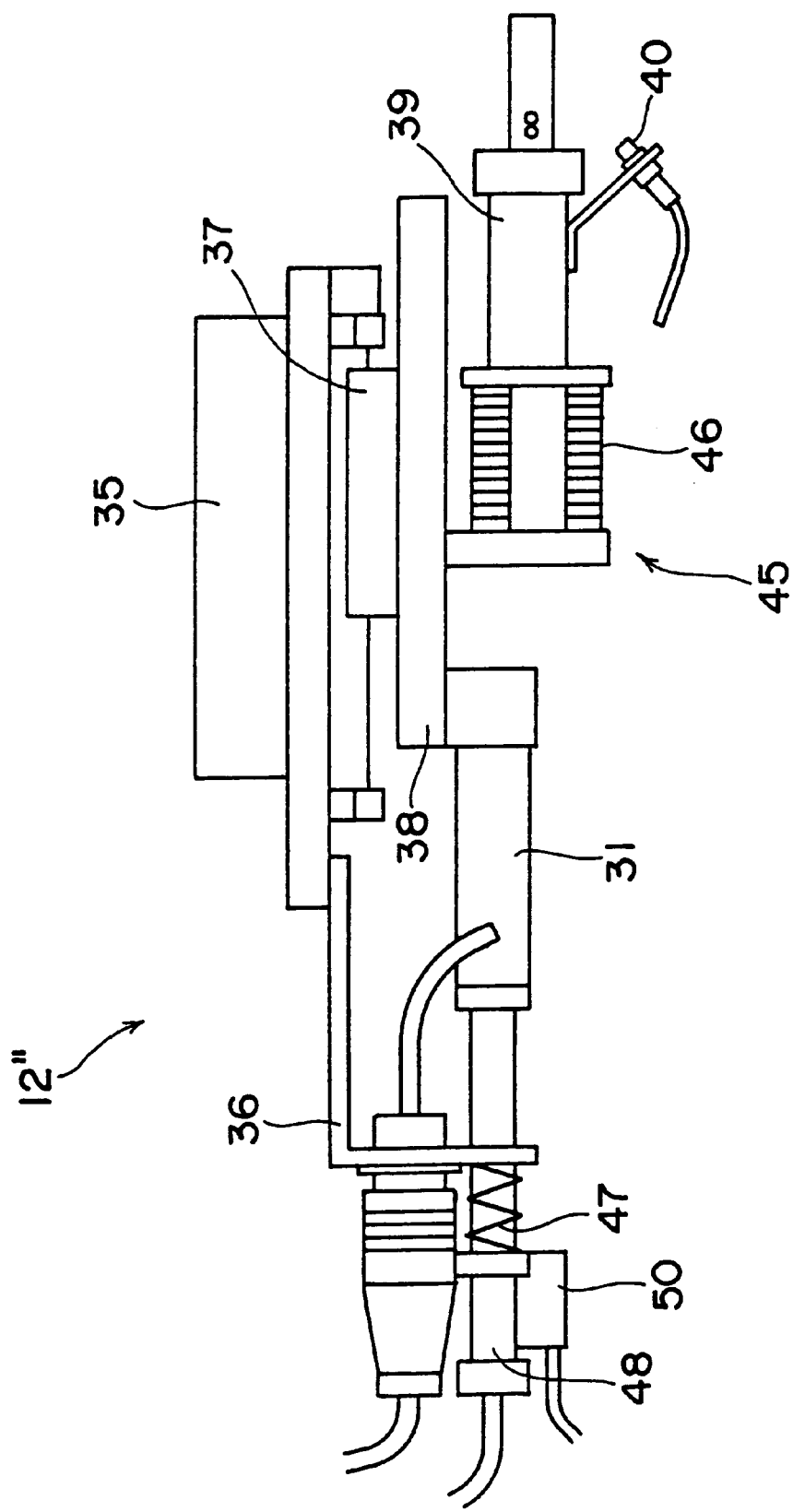
FIG. 11 is a plan view of another chuck hand.
Figure 12:
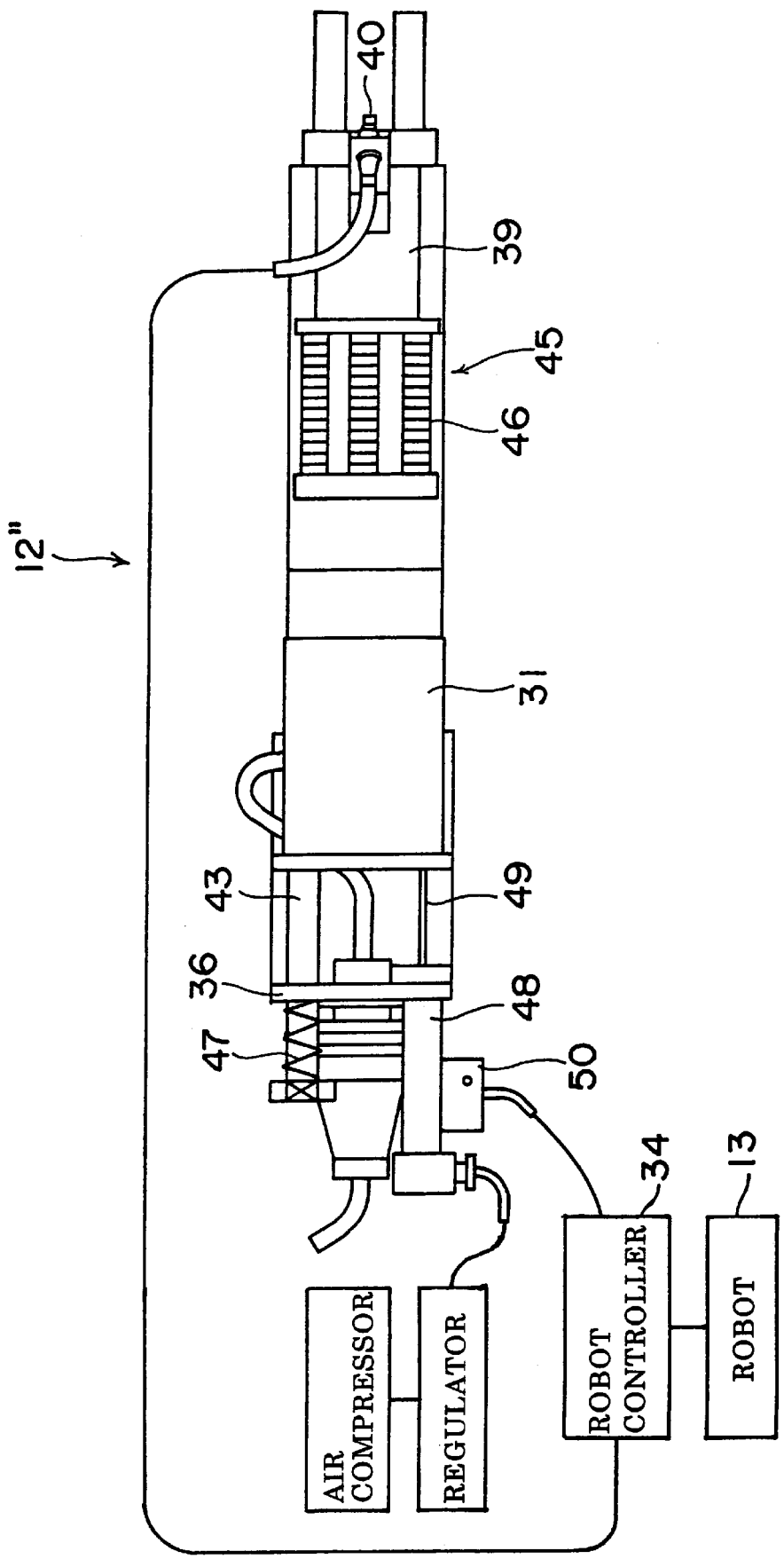
FIG. 12 is a side view of the chuck hand shown in FIG. 11.

FIG. 11 is a plan view of another chuck hand, and FIG. 12 is a side view of the chuck hand shown in FIG. 11. In a chuck hand 12" shown in FIGS. 11 and 12, instead of the jam-detecting dog 41, the jam-detecting sensor 42, and the coil spring 44 in the aforementioned chuck hand 12', a coil spring 47, an air cylinder 48, a shaft 49, and a sensor 50 are disposed. According to this example, only one axis is disposed as the axis 43.

The coil spring 47 is disposed between a flange portion of the axis 43 and the bracket 36 so that it does not come into contact with the outer circumferential surface of the axis 43. The air cylinder 48 is fixed on the bracket 36 in the position opposite to the load cell 31 for the bracket 36. The shaft 49 is attached to the air cylinder 48 and is in contact with an end of the load cell 31. The sensor 50 for detecting the position of the shaft 49 is attached to the air cylinder 48. The sensor 50 is connected to the robot controller 34, and thus the information on a hand jam can be sent to the robot controller 34. Herein, the force by which the air cylinder 48 presses out the shaft 49 is designed to be larger than the force of the sprint 47, so that the shaft 49 can be positioned in a state where the air cylinder 48 has completely pressed the shaft 49. Thereby, the chuck 39 and the like which is mounted on the moving base 38 can be positioned here.

In FIG. 12, reference character 51 designates an air compressor for supplying air into the air cylinder 48, and 52 designates a regulator for regulating the amount in which air flows.

Figure 13:
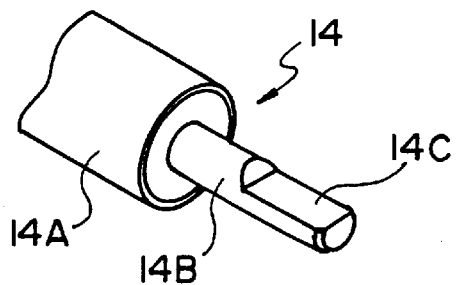
FIG. 13 is an enlarged perspective view of the shaft onto which the seal is slid.

FIG. 13 is an enlarged perspective view of the shaft 14 onto which the seal is slid. Although not shown in FIGS. 1 to 4, the shaft 14 comprises a cylindrical large-diameter portion 14A, an shaft body 14B projecting from the cylindrical large-diameter portion 14A, and a D-cut portion 14C formed in the end part of the shaft body 14B.

Figure 14:
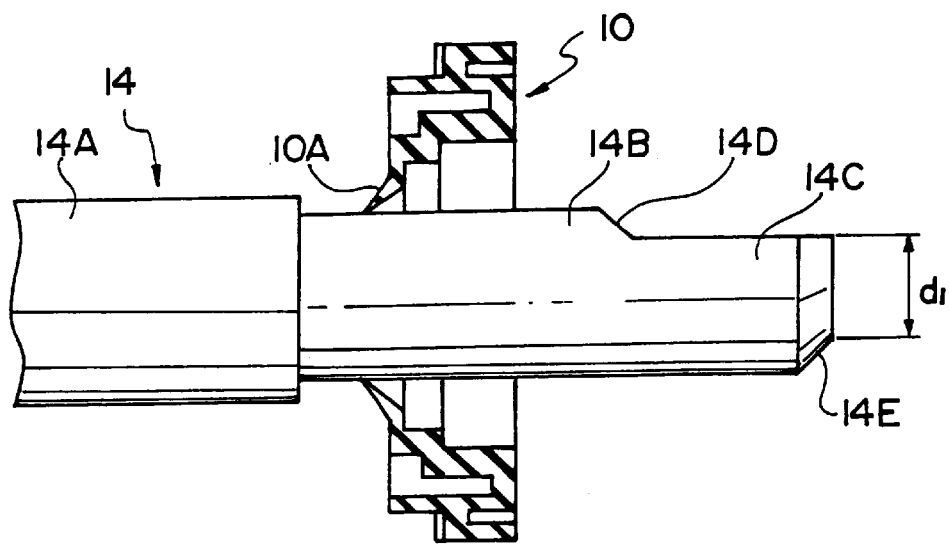
FIG. 14 is a sectional view of the seal which has been slid in a normal condition on the shaft.
Figure 15:
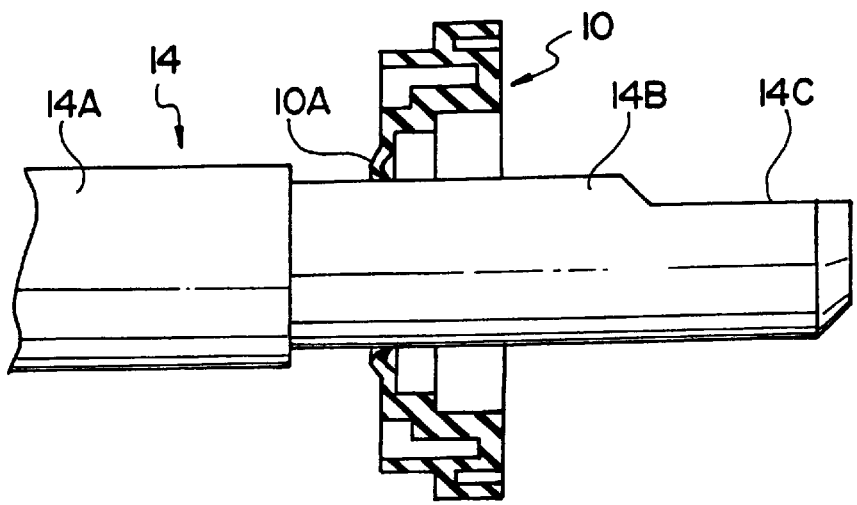
FIG. 15 is a sectional view of the seal which has not been slid in a normal condition on the shaft.

FIG. 14 shows an example where the seal 10 having a lip 10A is kept slid on the shaft 14 in a desirable form (in a state where the lip 10A is not curled), and FIG. 15 shows an example where the seal 10 is kept slid on the shaft 14 in an undesirable form (in a state where the lip 10A is curled). In the state shown in FIG. 14 where the seal 10 is kept slid on the shaft 14, the lip 10A is not kept curled, so that oil or dust can be prevented from flowing from the large-diameter portion 14A to the D-cut portion 14C of the shaft 14. On the other hand, in the state shown in FIG. 15 where the lip 10A is curled, oil or dust may flow from the large-diameter portion 14A to the D-cut portion 14C.

Next, there will be explained an operation in which the seal 10 is slid.

Figure 16:
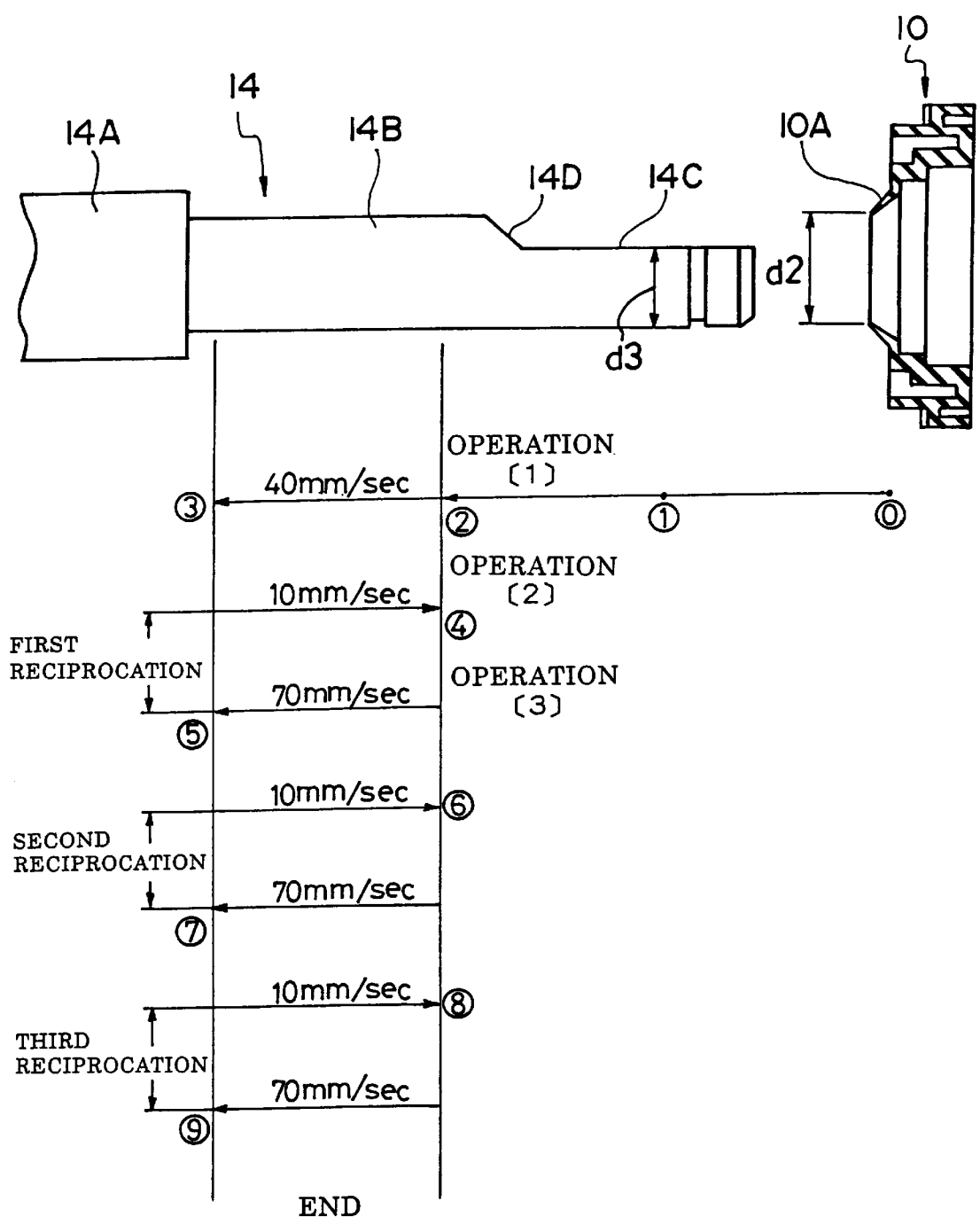
FIG. 16 is an explanatory drawing showing an operation in which the seal is slid.

FIG. 16 shows an example of the operation in which the seal 10 is slid onto the shaft 14 having the configuration shown in FIG. 13. Herein, naturally, the lip 10A is directed toward the shaft 14 when the seal 10 is slid onto the shaft 14.

At first, the seal 10 is moved at an appropriate speed from a position 0 to a position 2 in FIG. 16, and then the seal 10 is moved from the D-cut portion 14C of the shaft 14 and is slid onto the end of the cylindrical shaft body 14B thereof. Sequently, the seal 10 is moved at a first speed (for example, at 40 mm/s) from the position 2 to a position 3. Herein, the position 3 should be determined so that the seal 10 does not come into contact with the end surface of the large diameter portion 14A of the shaft 14. At this time, the lip 10A of the seal 10 is probably thought to be completely curled. Thereafter, the seal 10 is pulled at a second speed (for example, at 10 mm/s) from the position 3 to a position 4. Then, the seal 10 is slid again at a third speed (for example, at 70 mm/s) from the position 4 to a position 5. The operations at the second speed and at the third speed of the aforementioned operations are desired to be made once or a plurality of times (three times in FIG. 16) so that the seal 10 is in a predetermined position when the final sliding operation has been made.

In general, among the aforementioned operations, in the pulling operations which are made from the position 3 to the position 4, from the position 5 to a position 6, and from a position 7 to a position 8, the lip 10A which has been curled is recovered as well as the seal 10 is pulled toward the end of the shaft 14. The longer the distance at which the seal 10 is pulled and moved is, the easier it is that the curled lip 10A is recovered. On the other hand, in the movements which are made from the position 2 to the position 3, from the position 4 to the position 5, from the position 6 to the position 7, and from the position 8 to a position 9, the seal 10 is slid inward on the shaft 14, which may cause the lip 10A to be curled. The shorter the distance at which the seal 10 is slid and moved inward is, the more the lip 10A is prevented from being curled.

In consideration of the two conditions mentioned above, in order to prevent the lip 10A from being curled, it is desirable that the slid-in distance is shorter and the pulled-out distance is longer, however, the two conditions cannot be met at one time because they are contrary to each other. Therefore, as mentioned above, the difference between the speed of the sliding-in operation and that of the pulling-out operation is made, in short, the speed of the sliding-in operation is made higher so as to prevent the lip 10A from being curled and that of the pulling-out operation is made lower so as to make the lip 10A more easily recovered.

In the case where the shaft onto which the seal 10 is slid has a step portion such as the D-cut portion 14C of the shaft 14 shown in FIG. 16, since the lip 10A is curled in the step portion, as shown in the example of FIG. 16, the pulling-out operation is designed to be made in the cylindrical part (the part of the shaft body 14B) of the shaft 14.

When the relative rotation between the seal 10 and the shaft 14 is made in the sliding-in operation from the position 4 to the position 5, from the position 6 to the position 7, and from the position 8 to a position 9, the frictional force between the lip 10A and the shaft 14 is generated not only in the sliding-in direction but also in the rotational direction of the shaft 14. and thereby the frictional force in the sliding-in direction is dispersed. As a result, the lip 10A can be prevented from being curled in the sliding-in operation.

When the seal 10 comes into contact with the shaft 14 in the aforementioned normal operation, even though the seal 10 is shifted from the shaft 14 in the radial direction of the shaft 14, the correcting mechanism 45 shown in FIGS. 9 to 12 can correct the mutual positional shift. On the other hand, the same function can be fulfilled in an unusual operation, that is, in a hand-jam operation. In the case where the chuck hand has the construction shown in FIGS. 7 to 10, when the chuck 39 is pressed by the large force, the spring 44 is contracted by the moving base 38 via the load cell 31. When the chuck 39 is pressed by larger force, the jam-detecting dog 41 comes across the jam-detecting sensor 42, then the information is sent to the robot controller 34, and thereby an emergency stop of the robot 13 is made.

In the case where the chuck hand 12 has the construction shown in FIGS. 11 and 12, even though the chuck 39 is pressed by the force, any part of the seal 10 is not moved in the shaft-central direction unless the force exceeds a limited strength. When the chuck 39 is pressed by larger force, the shaft 49 of the air cylinder 48 is pressed and moved by the moving base 38 via the load cell 31. Then, when the shaft 49 reaches the sensor 50, the sensor 50 detects that there is the shaft 49, the information is sent to the robot controller 34, and thereby an emergency stop of the robot 13 is made.

Next, there will be explained a method for judging whether the lip 10A is kept curled when the seal 10 has been slid onto the shaft 14. Herein, as the curled-lip judging method, there will be explained a curled-lip judging method 1 shown in FIG. 17, a curled-lip judging method 2 shown in FIG. 18, a curled-lip judging method 3 shown in FIG. 19, and a curled-lip judging method 4 shown in FIG. 20.

[Curled-Lip Judging Method 1]

Figure 17:
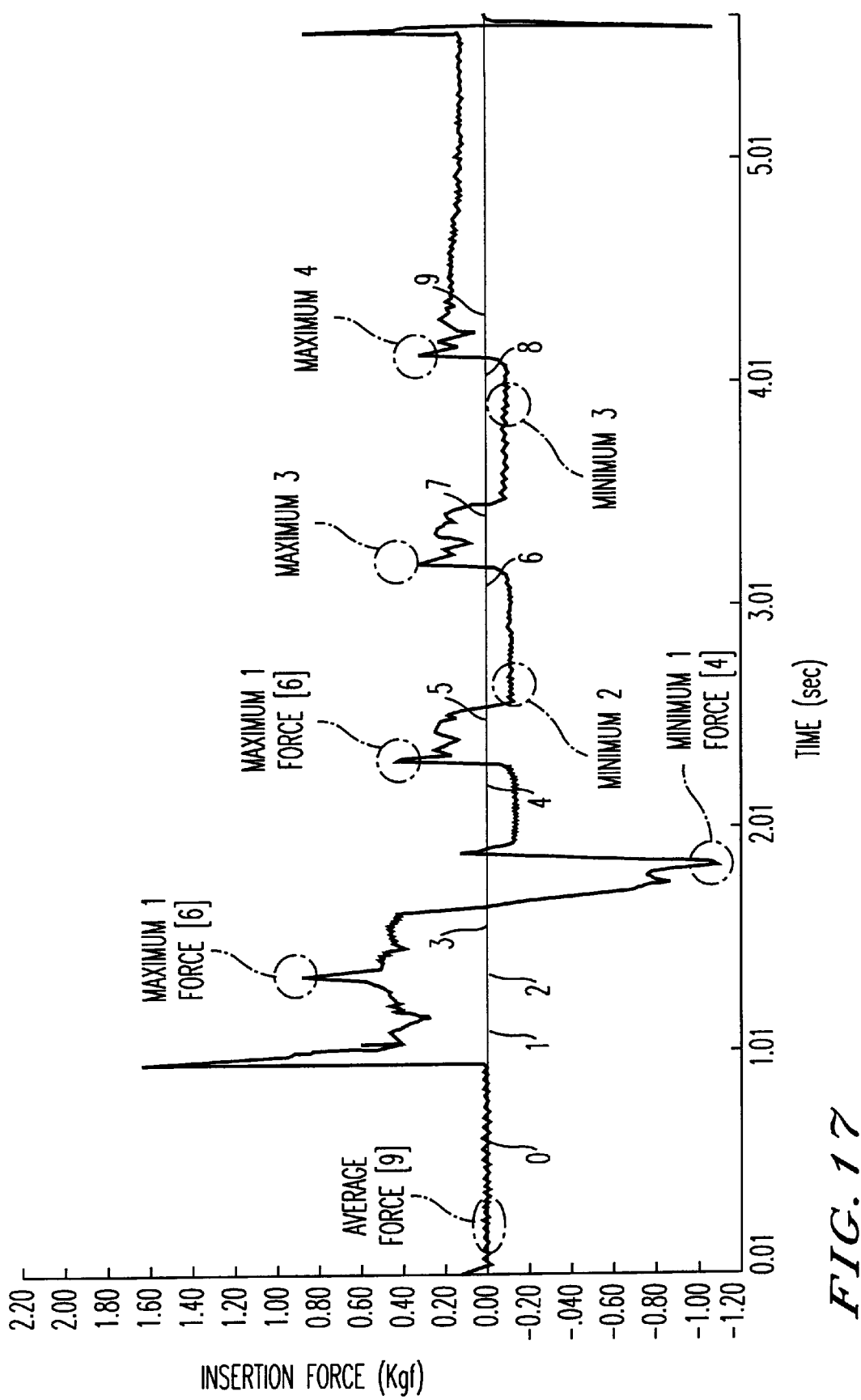
FIG. 17 is an explanatory diagram showing a first method for judging that the lip is curled.

During the seal-sliding-in operation, the voltage proportionate to the load applied on the load cell 31 is outputted from the load cell 31, and the voltage is amplified by the load-cell amplifier 32. The transition of the wave of the load is shown in FIG. 17. The axis of ordinates, and that of abscissas, in a graph shown in FIG. 17 show the sliding-in force or the pulling-out force (Kgf), and time (seconds), respectively. Points 0 to 9 shown in the wave transition graph correspond to the sliding-in force or the pulling-out force in the positions 0 to 9 shown in FIG. 16 at the operational time of the robot 13, respectively.

Several forces generated before the seal 10 comes into contact with the shaft 14 are averaged by the computer 33 (an average force 9: the maximum value or the minimum value mentioned below shows a value obtained by subtracting the average force 9 from a measured value). Herein, the maximum value of the sliding-in force from the position 1 to the position 3 shown in FIG. 16 is referred to as the maximum 1, the minimum value of the pulling-out force from the position 3 to the position 4 shown in FIG. 16 is referred to as the minimum 1, and the maximum values and the minimum values in the sequent forward-and-backward movements are referred to as the maximum 2, the maximum 3, the maximum 4, the minimum 2, and the minimum 3, respectively.

(1) In the case where a judgment is made by either the sliding-in force or the pulling-out force:

In the case where the absolute value of the minimum pulling-out force (the minimum 3) is larger than a predetermined value in the final pulling-out operation, the curled lip 10A is judged not to be recovered. Sequently, even though the sliding-in operation is made, the curled lip is not in the least be recovered. In the case where the maximum sliding-in force (the maximum 4) is larger than a predetermined value in the final sliding-in operation, the lip 10A is judged to be curled.

(2) In the case where a judgment is made by the proportion of the sliding-in force or the pulling-out force:

The proportion of the absolute value of the maximum sliding-in force (the maximum 1) in the first sliding-in operation and the absolute value of the minimum pulling-out force (the minimum 3) in the final pulling-out operation is calculated. In the case where the proportion of these absolute values is smaller than a predetermined value, the curled lip 10A is judged not to be recovered. Sequently, even though the sliding-in operation is made, the curled lip is not in the least be recovered. In the case where the proportion of the maximum sliding-in force (the maximum 1) in the first sliding-in operation and the maximum sliding-in force (the maximum 4) in the final sliding-in operation is calculated and this proportion is smaller than a predetermined value, the lip 10A is judged to be curled.

In (1) and (2) described above, in the case where the lip 10A is judged to be curled, the computer 33 outputs a warning signal showing that the lip 10A is kept curled and sends it into the robot controller 34, and thereby the movement of the robot 13 is stopped and a warning sound is made.

[Curled-Lip Judging Method 2]

When an unexpected noise come into the voltage signal outputted from the load cell 31, the voltage which is not the real voltage is inputted into the computer 33. If this unreal voltage becomes the maximum value, the unreal voltage may be used in order to judge whether the lip 10A is kept curled and thus an unprecise judgment may be made. In order to such an unprecise judgment, a curled-lip judgment shown in FIG. 18 is made.

Figure 18:
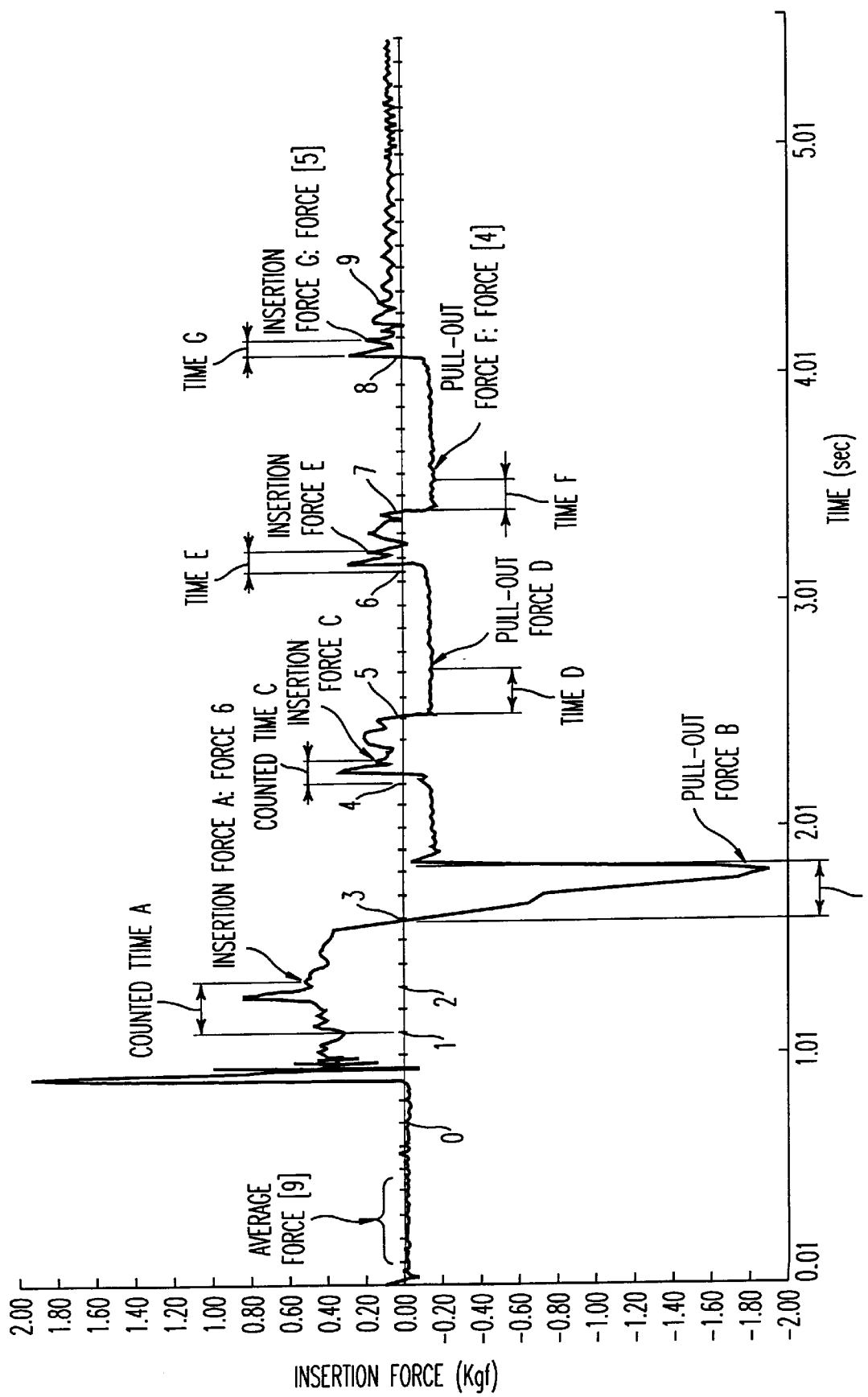
FIG. 18 is an explanatory diagram showing a second method for judging that the lip is curled.

In the same way as shown in FIG. 17, the axis of ordinates, and that of abscissas, in a graph shown in FIG. 18 show the sliding-in force or the pulling-out force (Kgf), and time (seconds), respectively. Points 0 to 9 shown in the wave transition graph correspond to the positions 0 to 9 shown in FIG. 16, respectively.

Several forces generated before the seal 10 comes into contact with the shaft 14 are averaged by the computer 33 (an average force 9: the sliding-in force and the pulling-out force mentioned below shows a value obtained by subtracting the average force 9 from a measured value). The seal 10 comes into contact with the shaft 14 and the sliding-in operation starts to be made, and then a certain period of time (a certain period of time A which is counted) passes from the time in the position 1. The sliding-in force at this time is referred to as A. Also, a certain period of time (a certain period of time B which is counted) passes from the time in the position 3 where the pulling-out operation starts to be made, and the pulling-out force at this time is referred to as B. In addition, certain periods of time C, E, and G pass from the time in the positions where the sequent sliding-in operations start to be made, and the sliding-in forces at the points of time is referred to as C, E, and G, respectively. Also, certain periods of time D and F pass from the time in the positions where the sequent pulling-out operations start to be made, and the pulling-out forces at the points of time is referred to as D and F, respectively.

(1) In the case where a judgment is made either by the sliding-in force or by the pulling-out force:

In the case where the absolute value of the pulling-out force (the pulling-out force F) is larger than a predetermined value in the final pulling-out operation, the curled lip 10A is judged not to be recovered. In the case where the sliding-in force (the sliding-in force G) is larger than a predetermined value in the final sliding-in operation, the lip 10A is judged to be curled.

(2) In the case where a judgment is made by the proportion of the sliding-in force or the pulling-out force:

The proportion of the absolute value of the sliding-in force (the sliding-in force A) in the first sliding-in operation and the absolute value of the pulling-out force (the pulling-out force G) in the final pulling-out operation is calculated. In the case where the proportion of these absolute values is smaller than a predetermined value, the curled lip 10A is judged not to be recovered. In the case where the proportion of the sliding-in force (the sliding-in force A) in the first sliding-in operation and the sliding-in force (the sliding-in force G) in the final sliding-in operation is calculated and this proportion is smaller than a predetermined value, the lip 10A is judged to be curled.

In (1) and (2) described above, in the case where the lip 10A is judged to be curled, the computer 33 outputs a warning signal showing that the lip 10A is kept curled and sends it into the robot controller 34, and thereby the movement of the robot 13 is stopped and a warning sound is made.

[Curled-Lip Judging Method 3]

In FIG. 18, the sliding-in force or the pulling-out force at the point of time when a certain period of time has passed is used in order to judge whether the lip 10A is kept curled, and only one force of the sliding-in force and the pulling-out force is used. In other words, in order to make a curled-lip judgment, only the sliding-in force A is used in the first sliding-in operation, only the pulling-out force F is used in the final pulling-out operation, and only the sliding-in force G is used in the final sliding-in operation. However, in the case where only one force of the sliding-in force and the pulling-out force is used in order to make a curled-lip judgment, a precise curled-lip judgment may be prevented from being made eaten with a slight noise coming in. In order to such an unprecise judgment, a curled-lip judgment shown in FIG. 19 should be made.

Figure 19:
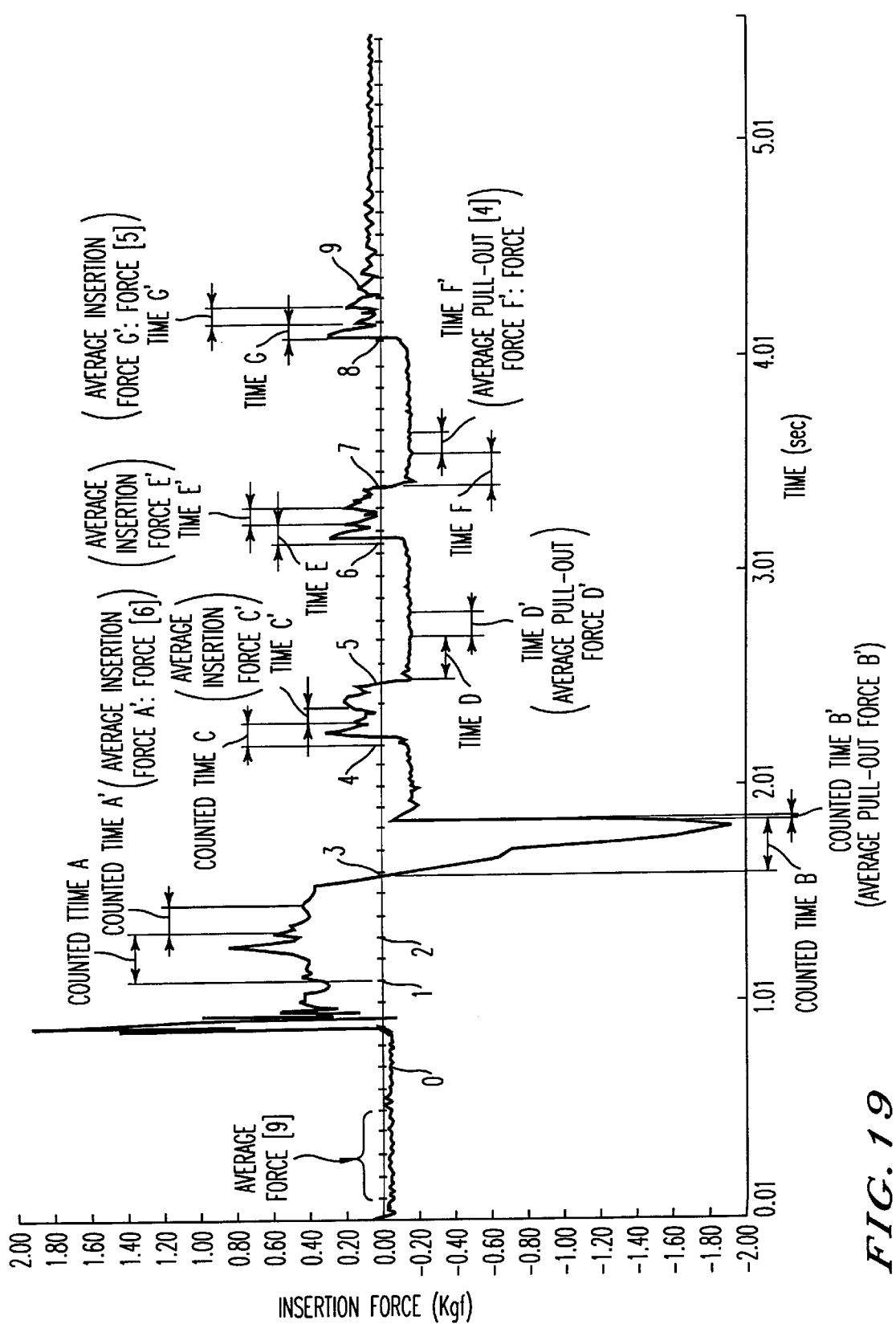
FIG. 19 is an explanatory diagram showing a third method for judging that the lip is curled.

In the same way as shown in FIG. 17 or FIG. 18, the axis of ordinates, and that of abscissas, in a graph shown in FIG. 19 show the sliding-in force or the pulling-out force (Kgf), and time (seconds). respectively, According to this curled-lip judging method, the seal 10 comes into contact with the shaft 14 and the sliding-in operation starts to be made, and then a certain period of time (a counted period of time A) passes from the time in the position 1. Thereafter, the sliding-in force is measured during a certain period of time (a counted period of time A'). Also, after a certain period of time (a counted period of time B) has passed from the time in the position 3 where the pulling-out operation starts to be made, the pulling-out force is measured during a certain period of time (a counted period of time B'). In the same way as mentioned above, after certain periods of time C, E, and G have passed from the time in the positions where the sliding-in operations start to be made, the sliding-in forces are measured during counted periods of time C', E', and G', respectively. Also, after certain periods of time D and F have passed from the time in the positions where the pulling-out operations start to be made, the pulling-out forces are measured during counted periods of time D' and F', respectively.

Then, the average value (the average sliding-in force A') of the sliding-in forces obtained in the measurement which has been taken a plurality of times during the counted period of time A' is calculated. Similarly, the average values (the average pulling-out forces B', D', and F') of the pulling-out forces obtained in the measurement which has been taken a plurality of times during the counted periods of time B', D', and F' are calculated. In the same way the average values (the average sliding-in forces C', E', and G') of the sliding-in forces obtained in the measurement which has been taken a plurality of times during the counted periods of time C', E', and G' are calculated.

(1) In the case where a judgment is made either by the sliding-in force or by the pulling-out force:

In the case where the absolute value of the average value (the average pulling-out force F') of the pulling-out force is larger than a predetermined value in the final pulling-out operation, the curled lip 10A is judged not to be recovered. In the case where the average value (the average sliding-in force G') of the sliding-in force (the sliding-in force G) is larger than a predetermined value in the final sliding-in operation, the lip 10A is judged to be curled.

(2) In the case where a judgment is made by the proportion of the sliding-in force or the pulling-out force:

The proportion of the absolute value of the average value (the average sliding-in force A') of the sliding-in force in the first sliding-in operation and the absolute value of the average value (the average pulling-out force F') of the pulling-out force in the final pulling-out operation is calculated. In the case where the proportion of these absolute values is smaller than a predetermined value, the curled lip 10A is judged not to be recovered. In the case where the proportion of the average value (the average sliding-in force A') of the sliding-in force in the first sliding-in operation and the average value (the average sliding-in force G') of the sliding-in force in the final sliding-in operation is calculated and this proportion is smaller than a predetermined value, the lip 10A is judged to be curled.

In (1) and (2) described above, in the case where the lip 10A is judged to be curled, the computer 33 outputs a warning signal showing that the lip 10A is kept curled and sends it into the robot controller 34, and thereby the movement of the robot 13 is stopped and a warning sound is made.

[Curled-Lip Judging Method 4]

In the case where the seal 10 is slid onto the shaft 14 with being rotated, it can be judged whether the lip 10A is kept curled according to the sliding-in force detected in the sliding-in operation.

Figure 20:
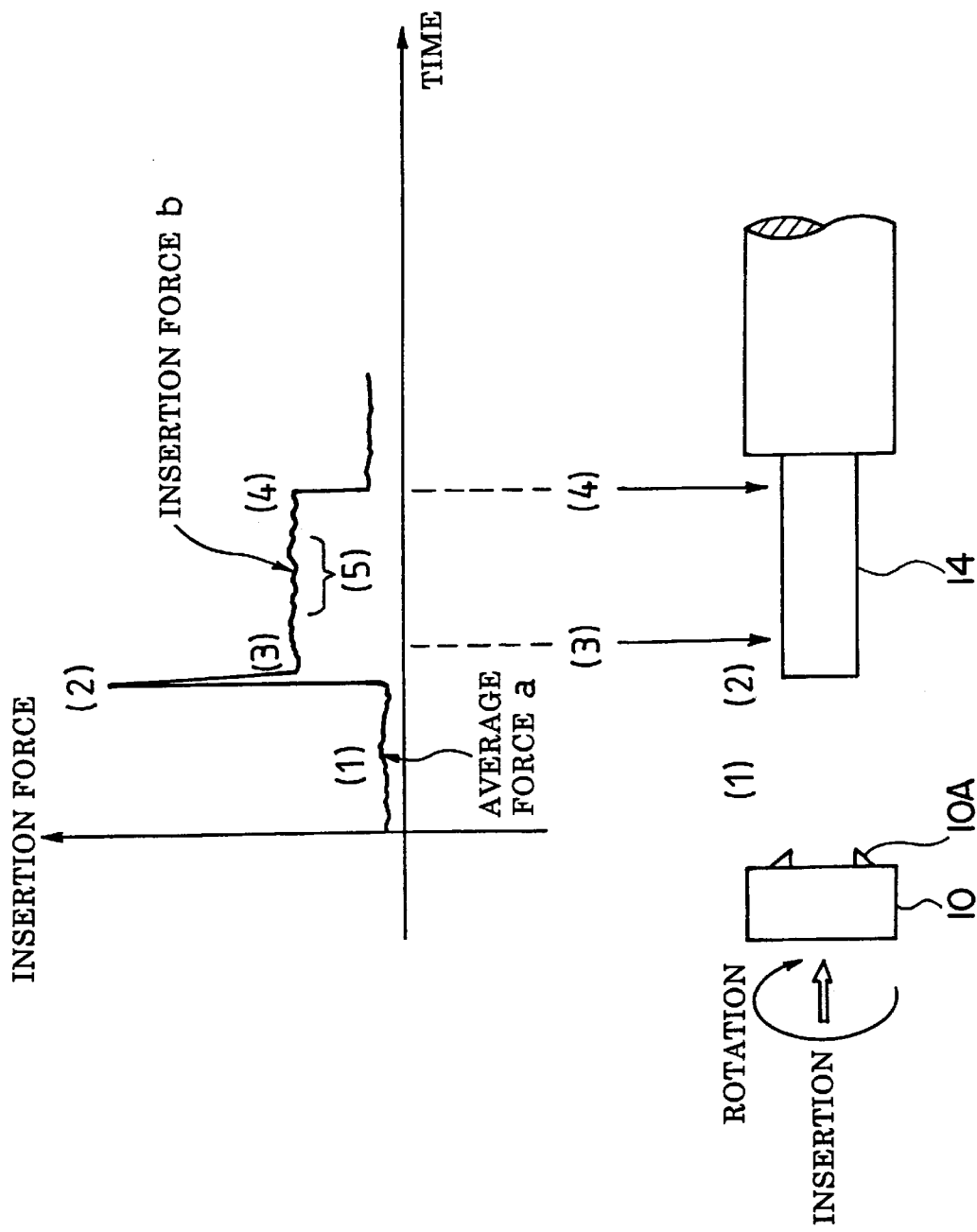
FIG. 20 is an explanatory diagram showing a fourth method for judging that the lip is curled.

FIG. 20 shows the variation in the sliding-in force detected when the seal 10 is slid onto the shaft 14. Before the seal 10 comes into contact with the shaft 14, that is, when the seal 10 is in a position (1), several forces are averaged by the computer 33 (an average force a: the sliding-in force mentioned below shows a value obtained by subtracting the average force a from a measured value). In FIG. 20, reference character (2) designates a position at the exact time when the seal 10 has been slid onto the shaft 14, (3) designates a position in which the seal 10 starts to be rotated and slid, (4) designates a position in which the seal 10 stops being rotated and completes its sliding-in. The seal 10 is rotated and slid in the region from (3) to (4).

The sliding-in force is detected, naturally, in the seal-rotating-and-sliding region from (3) to (4), however, it is usually detected in a region (5) where the output wave transition of the sliding-in force becomes stable. If the detected sliding-in force b is larger than a predetermined value, the lip 10A is judged to be kept curled. In this case, if any noises come into the system during the period of time when a judgment is made only by the detected sliding-in force b, a precise judgment may be prevented from being made. In order to such an unprecise judgment, it is desirable that the sliding-in force is detected a plurality of times in the region, (5) and that it is judged whether the lip 10A is kept curled according to the average value calculated from these detected values of the sliding-in force.

In FIG. 20, the seal 10 is rotated. However, the shaft 14 may also be rotated without any rotation of the seal 10, or both of the seal 10 and the shaft 14 may also be rotated. In the case where both of the seal 10 and the shaft 14 are rotated, preferably, the seal 10 should be rotated in the reverse direction to a rotational direction of the shaft 14.

[Curled-Lip Judging Method 5]

The time taken when the seal 10 is slid onto the shaft 14 varies with the work. Therefore, the period of time A which is counted from the position 1, which is shown in FIG. 18 or FIG. 19, may also vary with the work.

According to this curled-lip judging method, the sliding-in force in the first operation where the seal 10 is once slid onto the shaft 14 is measured point by point, the wave transitional line of the sliding-in force is obtained from the measured result. Since the seal 10 comes into contact with the shaft 14 when the seal 10 moves from the position 0 to the position 1, as shown in FIG. 18 or FIG. 19, the amplitude of the wave of the sliding-in force in the first operation varies largely and thus the wave transitional line becomes into a conspicuous transient state. Continuously, when the seal 10 moves from the position 1 to the position 2 in the sliding-in operation, the lip 10A comes into contact with the step portion (an inclined surface 14D) between the D-cut portion 14C and the shaft body 14B. At this time, also the amplitude oscillates to some extent. and a transient state of the wave is observed. In addition, a part of the lip 10A is curled. Sequently, when the seal 10 has reached the position 3 in the sliding-in operation, the sliding-in operation is shifted to the pulling-out operation, and thereby the value on the wave transitional line of the sliding-in force shifts from the area of positive values to that of negative values. Hence, when the seal 10 has reached the position 3, the lip 10A is kept curled over its whole circumference.

According to the usual wave transition of the sliding-in force mentioned above, the transient state on the wave transitional line of the sliding-in force is observed, and thereby the relative position between the shaft 14 and the seal 10 can be estimated. Then, the sliding-in force in the estimated position is detected. If the value obtained from the detected result is larger than a predetermined value, the lip 10A can be judged to be kept curled. According to the aforementioned method, errors in measurement in each work become less, so that a precise curled-lip judgment can be made.

The predetermined value which is used for judging the sliding-in force by comparison is determined according to data obtained in experiments. However, measured data of some works may be out of the range including data obtained in experiments, and in this case, a precise judgment cannot be made.

Therefore, according to this curled-lip judging method, the sliding-in force in a position estimated from the wave transitional line of the sliding-in force is used for preliminarily judging whether the curled-lip judgment can be made.

According to this method, the sliding-in force which is out of the data range obtained in experiments is eliminated from objective data for the judgment, so that the accuracy of the curled-lip judgment can be made higher.

Figure 21:
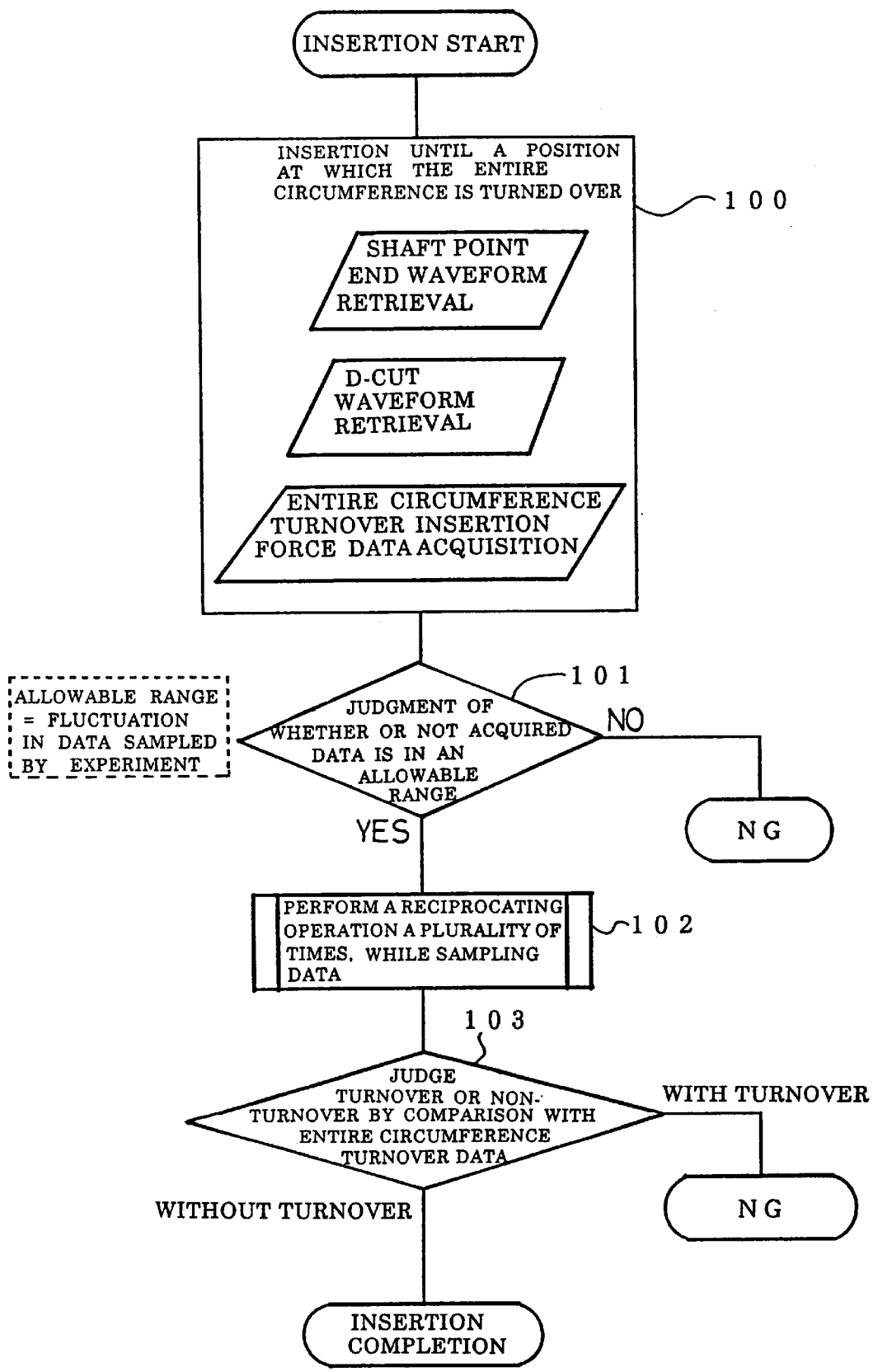
FIG. 21 is a flow chart showing a fifth method for judging that the lip is curled.

FIG. 21 is a flow chart showing this curled-lip judging method. In FIG. 21, steps 100 and 101 show processes comprised by this curled-lip judging method, and steps 102 and 103 show processes comprised by the aforementioned curled-lip judging method 1, 2, or 3, respectively.

When the seal 10 is slid onto the shaft 14, even the end of the lip 10A may be curled. In order to resolve this problem, as shown in FIG. 14, a taper portion 14E is formed in the end part of the shaft 14, and a diameter d1 of the end surface of the taper portion 14E is designed to be smaller than an inner diameter d2 (see FIG. 16) of the lip 10A of the seal 10. According to such a construction, even though the lip 10A has come into contact with the taper portion 14E while the seal 10 is slid onto the shaft 14, the lip 10A can be prevented from being curled.

Further, in order to prevent the lip 10A from being curled while the seal 10 is moving near the D-cut portion 14C (in the region between the position 1 and the position 2 shown in FIG. 16), it is necessary that the relation between a length d3 in the diametrical direction of the shaft 14 in the D-cut portion 14C (a segment of a line including the length d3 is perpendicular to the plane part of the D-cut portion 14C and is the minimum diameter), and the inner diameter d2 of the lip 10A of the seal 10, is designed to become as shown below.

$$d3 \leq d2$$

Next, there will be explained a method for recovering the curled lip into the initial state, by which the lip 10A is recovered even though the lip 10A has been curled.

[Method of Using the D-Cut Portion]

Figure 22:
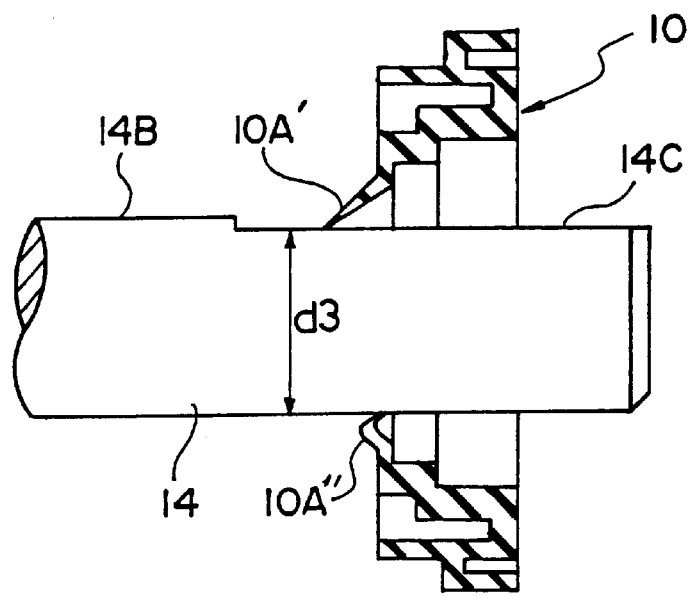
FIG. 22 is a schematic view of the seal and the shaft, showing a method for returning the curled lip into the initial state with a D-cut portion formed in the end of the shaft.

In the case where the D-cut portion 14C is formed in the shaft 14, as shown in FIG. 22, when the seal 10 is positioned on the D-cut portion 14C, the curled lip 10A is recovered with the difference in step between the shaft body 14B and the D-cut portion 14C. In FIG. 22, reference character 10A' designates a portion in which the curled lip 10A has been recovered, and 10A" designates a portion in which the curled lip 10A has not been recovered.

Figure 23:
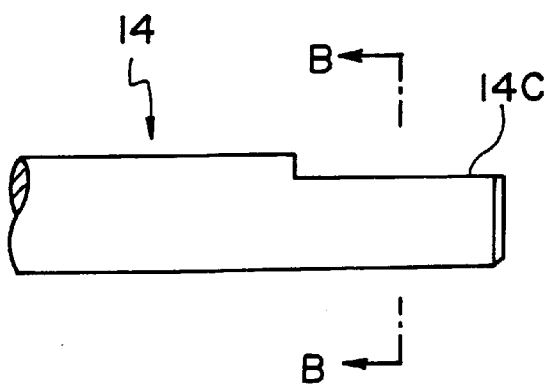
FIG. 23(A) is a front view of a shaft with the D-cut portion.
FIG. 23(B) is a sectional view of the shaft, cut along a B—B line in FIG. 23(A).
Figure 23:
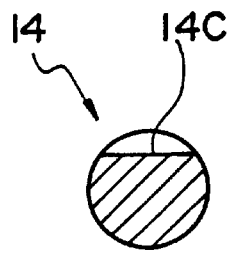
Figure 24:
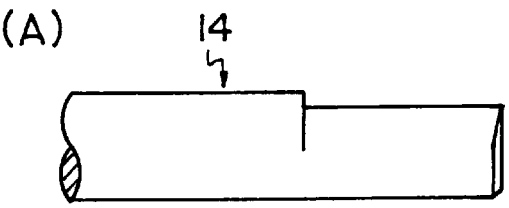
FIG. 24(A) is a front view of a shaft with a cylindrical convex cut surface.
FIG. 24(B) is a sectional view of the essential part of the shaft in FIG. 24(A).
Figure 24:
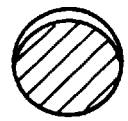
Figure 25:
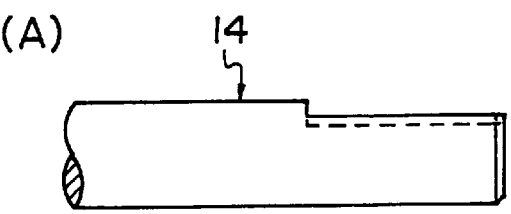
FIG. 25(A) is a front view of a shaft with a cylindrical concave cut surface.
FIG. 25(B) is a sectional view of the essential part of the shaft in FIG. 25(A).
Figure 25:
Figure 26:
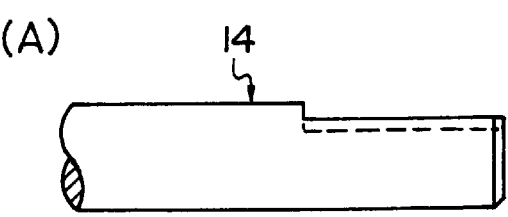
FIG. 26(A) is a front view of a shaft with a groove-like cut surface.
FIG. 26(B) is a sectional view of the essential part of the shaft in FIG. 26(A).
Figure 26:
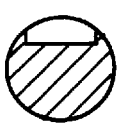
Figure 27:
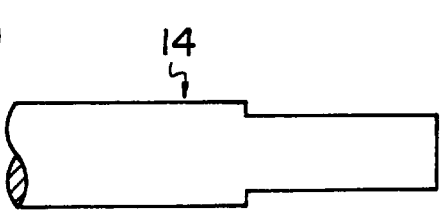
FIG. 27(A) is a front view of a shaft with a flat cut surface on both side of the shaft.
FIG. 27(B) is a sectional view of the essential part of the shaft in FIG. 27(A).
Figure 27:
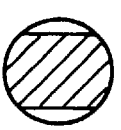
Figure 28:
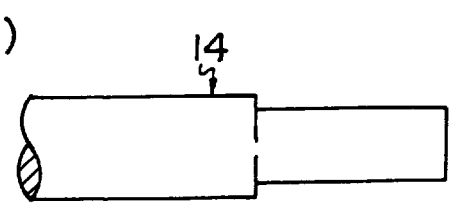
FIG. 28(A) is a front view of a shaft with a cylindrical convex cut surface on both side of the shaft.
FIG. 28(B) is a sectional view of the essential part of the shaft in FIG. 28(A).
Figure 28:
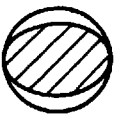

In the D-cut portion 14C, as described above, the length d3 in the diametrical direction is designed to be shorter than the inner diameter d2 of the lip 10A. FIGS. 23(A) and 23(B) show the shaft 14 having the D-cut portion 14C. FIG. 23(A) is a front view of the shaft 14, and FIG. 23(B) is a sectional view of the shaft 14, cut along a B—B line in the D-cut portion 14C.

As shown in FIG. 22, when the shaft 14 is rotated while the seal 10 is on the D-cut portion 14C, the curled lip 10A starts to be recovered with the rotation of the D-cut portion 14C and is recovered over the entire circumference at the time when the shaft 14 has made substantially one rotation. In order to ensure the recovery of the curled lip, desirably, the shaft 14 is rotated once or more times. Herein, the shaft 14 may be rotated in a state where the seal 10 does not move or does move (i.e., slide in and pull out) in the direction of the axial line of the shaft 14. After the curled lip has been recovered, the seal 10 is moved to the predetermined position of the shaft body 14B. Thereby, the seal 10 can be slid onto the shaft 14 without being curled over the entire circumference of the shaft 14.

In the case where the step portion is formed between the D-cut portion 14C and the shaft body 14B, when the seal 10 which has recovered from the state where the lip is kept curled moves from the D-cut portion 14C to the shaft body 14B, the lip 10A may be hooked and curled again by the step portion. In order to prevent the lip 10A from being curled again, the shaft 14 is rotated while the seal 10 is moving. Further, as shown in FIGS. 14 to 16, in the case where the inclined surface 14D is formed in the step portion between the shaft body 14B and the D-cut portion 14C, when the seal 10 is slid in from the D-cut portion 14C to the shaft body 14B, the lip 10A can be prevented from being hooked and curled by the step portion.

In order to recover the curled lip 10A to the initial state, instead of the D-cut portion 14C, a cut portion shown in each of FIGS. 24(A), 24(B) to 28(A), 28(B) may also be formed in one end part of the shaft 14. In FIGS. 24(A), 24(B) to 28(A), 28(B), (A) is a front view of the shaft 14, and (B) is a sectional view of the shaft 14 in the same position as the position shown in FIGS. 23(A) and 23(B), respectively.

While the D-cut portion 14C shown in FIGS. 23(A) and 23(B) has a flat cut surface, that in FIGS. 24(A) and 24(B) has a cylindrical convex cut surface, that in FIGS. 25(A) and 25(B) has a cylindrical concave cut surface, and that in FIGS. 26(A) and 26(B) has a groove-like cut surface. In FIGS. 27(A) and 27(B), flat cut surfaces are formed on both sides of the shaft 14, and in FIGS. 28(A) and 28(B), cylindrical convex cut surfaces (an elliptic shape in its sectional view) are formed on both sides of the shaft 14.

Figure 29:
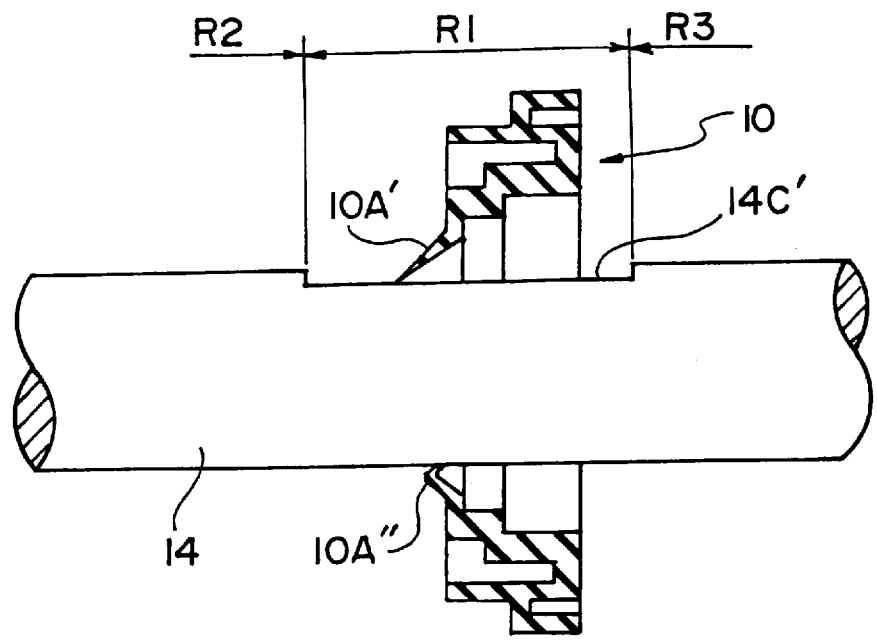
FIG. 29 is a schematic view of the seal and the shaft, showing a method for returning the curled lip into the initial state with a D-cut portion formed in the middle part in the longitudinal direction of the shaft.

In FIGS. 22 to 28(A), 28(B), the D-cut portion 14C is formed in one end part of the shaft, however, as shown in FIG. 29, in order to recover the curled seal 10, a D-cut portion 14C' may also be formed in a certain part of the shaft 14 so that the shaft 14 is rotated after the seal 10 has been positioned on the D-cut portion 14C'. Herein, the part of the D-cut portion 14C' may also be shaped as shown in FIGS. 24(A), 24(B) to 28(A), 28(B).

In FIG. 29, reference character R1 designates a region of the D-cut portion 14C' of the shaft 14, R2 designates a cylindrical region of the shaft 14 in the direction of the front end of the lip 10A (in the direction toward which the seal 10 is slid in), and R3 designates a cylindrical region of the shaft 14 in the direction of the back end of the lip 10A (in the direction from which the seal 10 is slid in). The shaft 14 is rotated in the region R1, so that the seal 10 can be recovered from its curled state. Next, when the seal 10 is moved (is slid in more) toward the region R2, in the same way as shown in FIG. 22, the lip 10A may be curled again in the boundary between the region R1 and the region R2 because of a step portion. In this case, also, in order to prevent the lip 10A from being curled again, the shaft 14 is rotated while the seal 10 is moving.

In FIG. 22 and FIG. 29, only the shaft 14 is designed to be rotated at the time when the seal 10 is on the D-cut portion 14C or 14C'. However, only the seal 10 may also be rotated without any rotation of the shaft 14, or both of the shaft 14 and the seal 10 may also be rotated.

The aforementioned seal-sliding apparatus in FIG. 1 or FIG. 2 is used in order to rotate only the shaft 14, the aforementioned seal-sliding apparatus in FIG. 3 is used in order to rotate only the seal 10, and the aforementioned seal-sliding apparatus in FIG. 4 is used in order to rotate both of the shaft 14 and the seal 10. In the case where both of the shaft 14 and the seal 10 are rotated, preferably, preferably, the shaft 14 should be rotated in the reverse direction to a rotational direction of the seal 10.

[Method of Using the Circumferential Groove]

Figure 30:
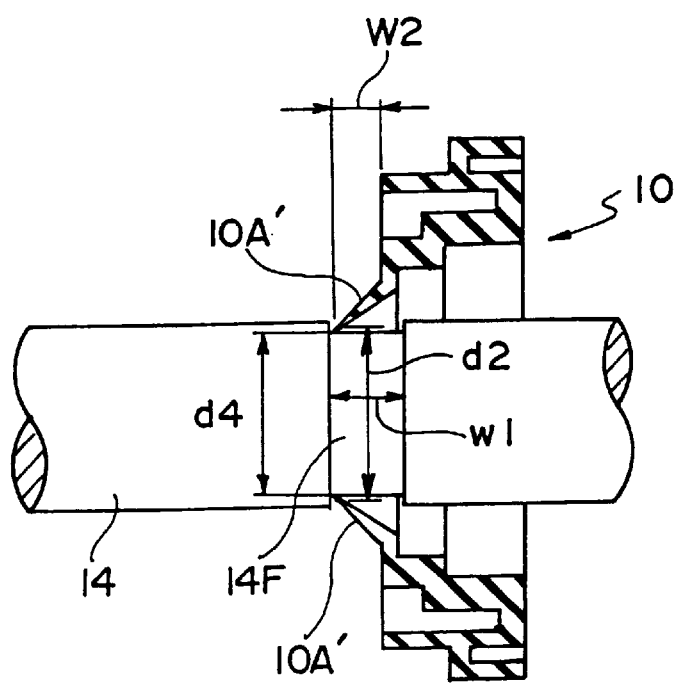
FIG. 30 is a schematic view of the seal and the shaft, showing a method for returning the curled lip into the initial state with a circumferential groove formed in the outer surface of the shaft.

FIG. 30 shows a method for returning the curled lip into the initial state with a circumferential groove 14F formed in the outer surface of the shaft 14. A width w1 of the circumferential groove 14F is larger than a height w2 by which the lip 10A projects, and an outer diameter d4 of the bottom part of the circumferential groove 14F is smaller than an inner diameter d2 of the lip 10A.

In the case where the circumferential groove 14F is formed, when the seal 10 is positioned on the circumferential groove 14F, the curled lip 10A is recovered to the initial state at the circumferential groove 14F. When it is recovered even though the seal 10 is positioned on the circumferential groove 14F, the shaft 14 is rotated relatively to the seal 10 in order to ensure that the curled lip 10A is recovered.

Herein, the section (the plane perpendicular to the central axis) of the shaft 14 at the circumferential groove 14F has a circular shape. However, as long as the circumferential groove 14F has an enough depth to recover the curled lip 10A, the section mentioned above may also have another shape such as an elliptic shape.

[Method of Using the Jig Member]

Figure 31:
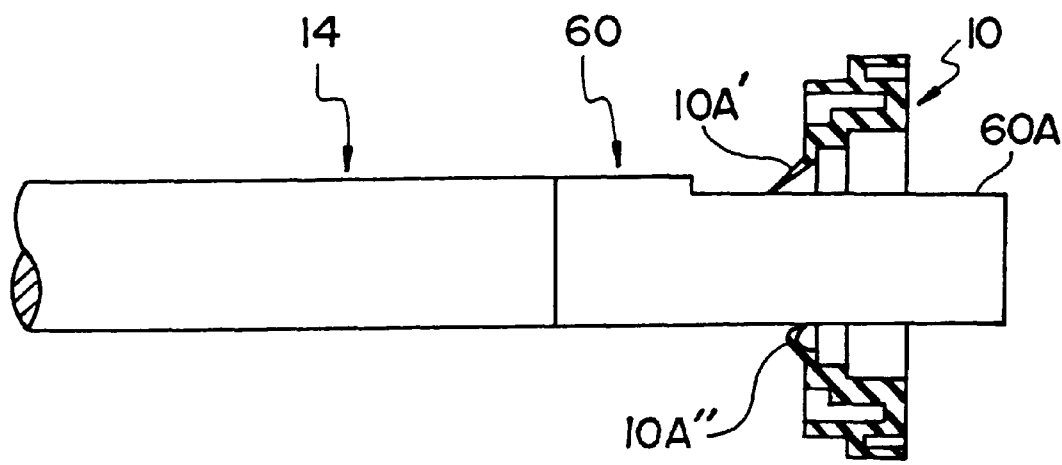
FIG. 31 is a schematic view of the seal and the shaft, showing a method for returning the curled lip into the initial state with a jig member having a D-cut portion.

FIG. 31 shows a method for returning the curled lip into the initial state with a jig member 60 which is connected to the end surface of the shaft 14 in the case where the shaft 14 does not have a D-cut portion or a circumferential groove. A D-cut portion 60A is formed on one side of the jig member 60, and the jig member 60 is combined with the shaft 14 so as to correspond to the central axis of the shaft 14. When lip 10A has been curled, the seal 10 is brought to the D-cut portion 60A and the jig member 60 is rotated relatively to the seal 10, so that the curled lip 10A can be recovered. Herein, the jig member 60 or the seal 10 needs to be rotated once or more times.

Figure 32:
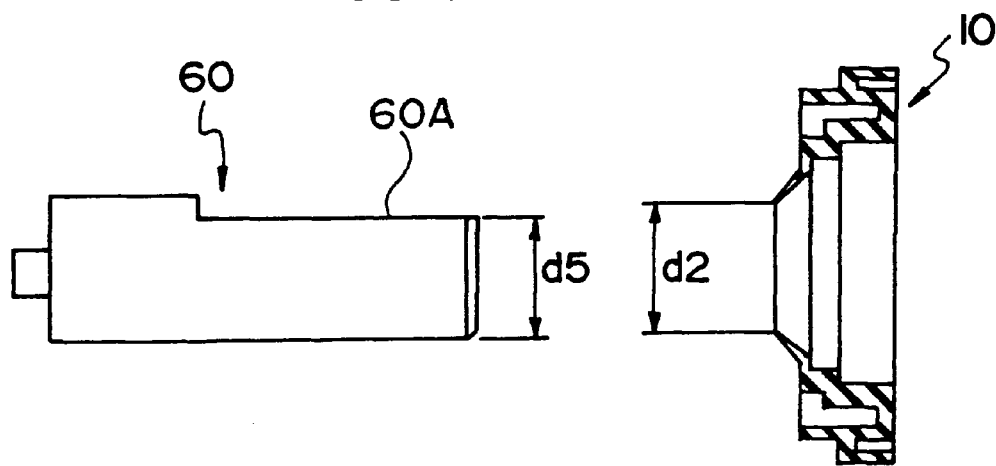
FIG. 32 is a schematic view of the seal and the shaft, showing the relation between the D-cut portion of the jig member and the inner diameter of the lip.
Figure 34A:
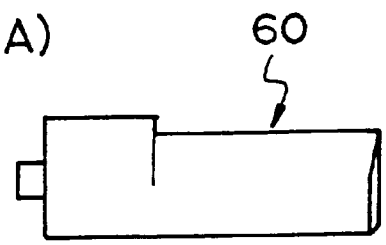
FIG. 34(A) is a front view of a jig member having a cylindrical convex cut surface.
Figure 34B:
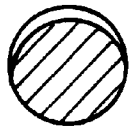
FIG. 34(B) is a sectional view of the essential part of the jig member in FIG. 34(A).
Figure 35A:
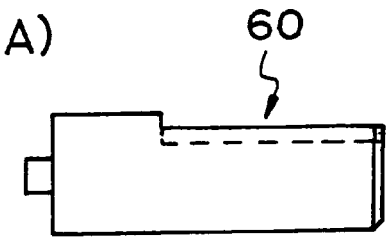
FIG. 35(A) is a front view of a jig member having a cylindrical concave cut surface.
Figure 35B:
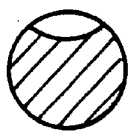
FIG. 35(B) is a sectional view of the essential part of the jig member in FIG. 35(A).
Figure 36A:
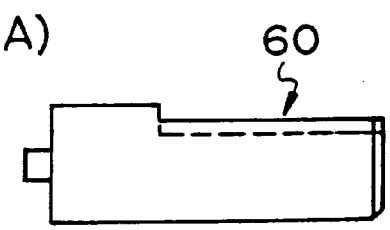
FIG. 36(A) is a front view of a jig member having a groove-like cut surface.
Figure 36B:
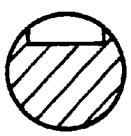
FIG. 36(B) is a sectional view of the essential part of the jig member in FIG. 36(A).
Figure 37A:
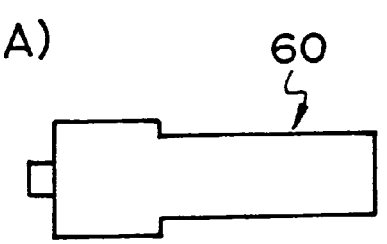
FIG. 37(A) is a front view of a jig member having a flat cut surface on both side of the jig member.
Figure 37B:
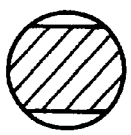
FIG. 37(B) is a sectional view of the essential part of the jig member in FIG. 37(A).
Figure 38A:
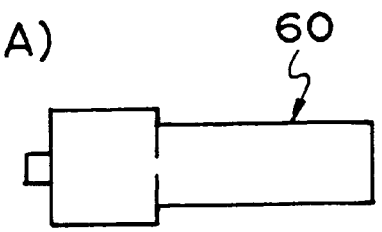
FIG. 38(A) is a front view of a jig member having a cylindrical convex cut surface on both side of the jig member.
Figure 38B:
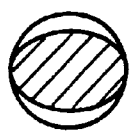
FIG. 38(B) is a sectional view of the essential part of the jig member in FIG. 38(A).

As shown in FIG. 32, in the jig member 60, a length d5 in the diametrical direction at the D-cut portion 60A is designed to be shorter than the inner diameter d2 of the lip 10A.

FIGS. 33(A) to (D) show some methods for combining the jig member 60 with the shaft 14. According to a method shown in FIG. 33(A), a square-pillar-shaped shaft 60B is disposed at the end surface of the jig member 60, and the square-pillar-shaped shaft 60B is engaged with a square-pillar-shaped hole 14G formed in the end of the shaft 14 so that the jig member 60 is combined with the shaft 14. According to a method shown in FIG. 33(B), a cylindrical shaft 60C is disposed at the end surface of the jig member 60, and the cylindrical shaft 60C is engaged with a cylindrical hole 14H formed in the end of the shaft 14 so that the jig member 60 is combined with the shaft 14.

In the case shown in FIG. 33(A), since a square-pillar-shaped portion such as the square-pillar-shaped shaft 60B is engaged with a square-pillar-shaped portion such as the square-pillar-shaped hole 14G, when the shaft 14 is rotated, the rotating force can be securely transmitted to the jig member 60. On the other hand, since a cylindrical portion such as the cylindrical shaft 60C is engaged with a cylindrical portion such as the cylindrical hole 14H, a slip may occur between the cylindrical shaft 60C and the cylindrical hole 14H. Thereby, the rotating force of the shaft 14 may not be securely transmitted to the jig member 60. In such a case, if the shaft 14 is made of, for example, a magnetic material such as iron or the like, as shown in FIG. 33(C), a magnet 60D is attached to the end part of the jig member 60, so that the shaft 14 can be prevented from slipping on the jig member 60. Further, as shown in FIG. 33(D), any special constructions other than the construction where the magnet 60D is attached to the end part of the jig member 60 are not required. Such a method is preferably used in the case where the end part of the shaft 14 or the jig member 60 cannot be processed.

Further, if the jig member 60 is made of, for example, a magnetic material such as iron or the like, a magnet can also be attached to the end part of the shaft 14. Further, a magnet may also be attached to each end part of the shaft 14 and the jig member 60.

Further, instead of the D-cut portion 14C, a cut portion having a shape shown in each of FIGS. 34(A), 34(B) to 38(A), 38(B), can be formed in one end part of the jig member 60. In FIGS. 34(A), 34(B) to 38(A), 38(B), (A) is a front view of the jig member 60, and (B) is a sectional view of the jig member 60 at the cut portion. While the D-cut portion 14C has a flat cut surface, that in FIGS. 34(A) and 34(B) has a cylindrical convex cut surface, that in FIGS. 35(A) and 35(B) has a cylindrical concave cut surface, and that in FIGS. 36(A) and 36(B) has a groove-like cut surface. In FIGS. 37(A) and 37(B), flat cut surfaces are formed on both sides of the jig member 60, and In FIGS. 38(A) and 38(B), cylindrical convex cut surfaces (an elliptic shape in its sectional view) are formed on both sides of the shaft 14.

Further, the D-cut portion 60A or the cut portion shown in each of FIGS. 34(A), 34(B) to 38(A), 38(B), can also be formed in the middle part in the longitudinal direction of the jig member 60.

Figure 39:
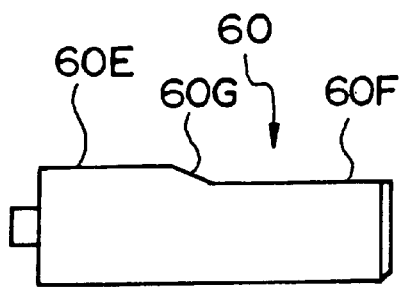
FIG. 39 is a front view of a jig member having an inclined surface in a stepped portion.

In the case where there is a step portion between the circular part (the part close to the shaft 14) of the jig member 60 and the cut portion (e.g., the D-cut portion 60A), when the seal recovered from the curled state moves from the jig member 60 toward the shaft 14, the lip 10A may be hooked and curled again by the step portion. Therefore, in this case, the jig member 60 is rotated relatively to the seal 10, and thus the lip 10A can be prevented from being curled again. Further, as shown in FIG. 39, if an inclined surface 60G is formed in the step portion between a circular part 60E of the jig member 60 and a cut portion 60F, the lip 10A can be prevented from being hooked and curled by the step portion.

Figure 40:
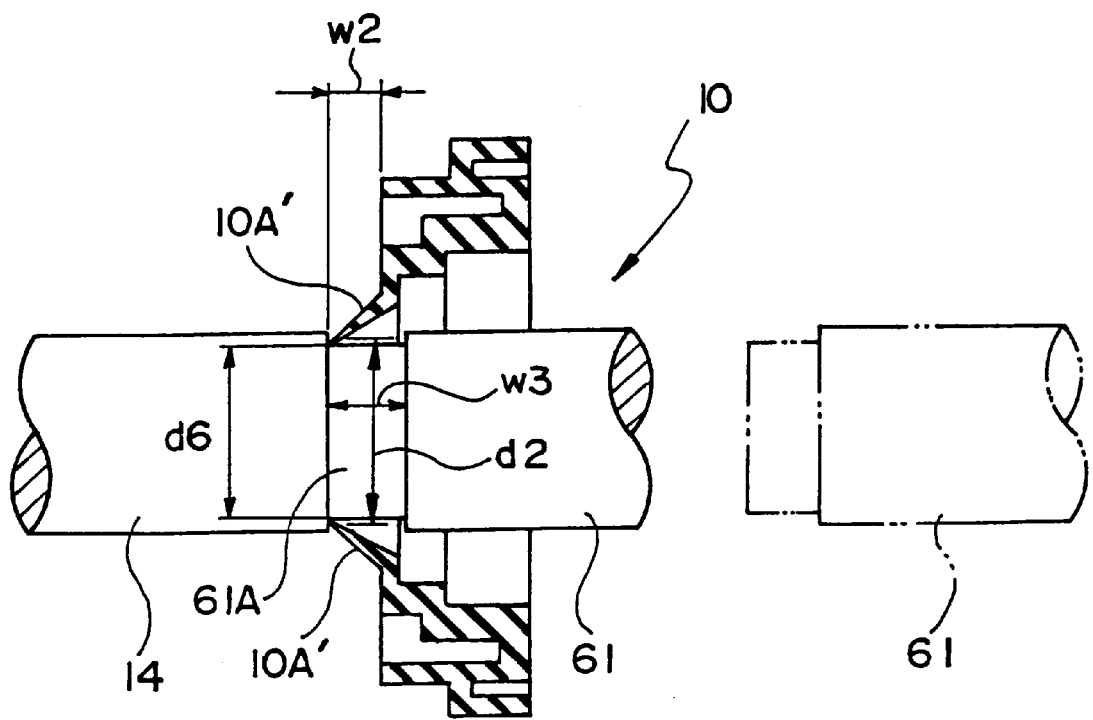
FIG. 40 is a schematic view of the seal and the shaft, showing a method for returning the curled lip into the initial state with a jig member having a circumferential groove.

Further, a jig member 61 shown in FIG. 40 can also be used in order to recover the curled seal 10. A small-diameter portion 61A is formed at the end surface of the jig member 61. The small-diameter portion 61A is connected to the end surface of the shaft 14, whose construction is equivalent to the circumferential groove 14F shown in FIG. 30. According to the construction shown in FIG. 40, therefore, the curled seal 10 can be recovered at the circumferential groove.

Herein, a length w3 by which the small-diameter portion 61A projects is longer than the height w2 of the lip 10A, and in addition, an outer diameter d6 of the small-diameter portion 61A is shorter than the inner diameter d2 of the lip 10A. Further, the small-diameter portion 61A can be formed in the middle part in the longitudinal direction of the jig member 61 as well as at the end of the jig member 61.

What is claimed is:

1. A seal-sliding apparatus for sliding a seal with a lip onto a shaft, comprising:

holding means for holding said seal detachably in a direction of an axial line of said shaft; and shaft-rotating means for rotating said shaft;

wherein said seal is slid onto said shaft while said shaft is rotated around the axial line by said shaft-rotating means.

2. A seal-sliding apparatus according to claim 1, wherein said shaft-rotating means rotates said shaft in one direction.

3. A seal-sliding apparatus according to claim 1 wherein said shaft-rotating means rotates said shaft alternately in one direction and in a direction opposite to said one direction.

4. A seal-sliding apparatus for sliding a seal with a lip onto a shaft, comprising:

holding means for holding said seal detachably in a direction of an axial line of said shaft; and seal-rotating means for rotating said seal held by said holding means;

wherein said seal is slid onto said shaft while said seal is rotated around the axial line of said shaft by said seal-rotating means.

5. A seal-sliding apparatus according to claim 4, wherein said seal-rotating means rotates said seal in one direction.

6. A seal-sliding apparatus according to claim 4, wherein said seal-rotating means rotates said seal alternately in one direction and in a direction opposite to said one direction.

7. A seal-sliding apparatus for sliding a seal with a lip onto a shaft, comprising:

holding means for holding said seal detachably in a direction of an axial line of said shaft;

seal-rotating means for rotating said seal held by said holding means; and shaft-rotating means for rotating said shaft;

wherein said seal is slid onto said shaft while said seal is rotated by said seal-rotating means and while said shaft is rotated by said shaft-rotating means.

8. A seal-sliding apparatus according to claim 7, wherein said shaft-rotating means rotates said shaft in one direction, and said seal-rotating means rotates said seal in a direction opposite to said one direction of said shaft.

9. A seal-sliding apparatus according to claim 7, wherein said shaft-rotating means rotates said shaft alternately in one direction and in a direction opposite to said one direction, and said seal-rotating means rotates said seal in a direction opposite to the rotational direction of said shaft.

10. An apparatus for inserting a seal onto a shaft, said seal including an opening formed in a substantially same shape as an outer periphery of said shaft and contacting to said shaft, said seal further including a front end which contacts to said shaft and is formed to be thin along an axial direction of said shaft, said apparatus comprising:

holding means for holding said seal and sliding said seal onto said shaft; and controlling means for controlling said holding means so that a first operation is performed in which said seal is slid onto said shaft, thereafter a second operation is performed in which said seal is pulled out to a position where said seal does not slip off from said shaft, and thereafter a third operation is performed in which said seal is inserted again onto said shaft, the second and third operations being performed once or a plurality of times;

wherein said controlling means controls a first speed at which said seal is slid onto said shaft in said first operation, a second speed at which said seal is pulled out in said second operation, and a third speed at which said seal is inserted again onto said shaft in said third operation so that the first, second, and third speeds differ from each other, and the speed at which said seal is pulled out in said second operation is lower than the speed at which said seal is inserted in said third operation.

11. An apparatus according to claim 10, wherein said controlling means controls said seal to be slid onto said shaft while rotating said shaft in said third operation.

12. An apparatus for inserting a seal onto a shaft, said seal including an opening formed in a substantially same shape as an outer periphery of said shaft and contacting to said shaft, said seal further including a front end which contacts to said shaft and is formed to be thin along an axial direction of said shaft, said apparatus comprising:

holding means for holding said seal and sliding said seal onto said shaft; and controlling means for controlling said holding means so that a first operation is performed in which said seal is slid onto said shaft, thereafter a second operation is performed in which said seal is pulled out to a position where said seal does not slip off from said shaft, and thereafter a third operation is performed in which said seal is inserted again onto said shaft, the second and third operations being performed once or a plurality of times;

wherein said controlling means controls a first speed at which said seal is slid onto said shaft in said first operation, a second speed at which said seal is pulled out in said second operation, and a third speed at which said seal is inserted again onto said shaft in said third operation so that the first, second, and third speeds differ from each other, and the speed at which said seal is inserted in said third operation is higher than the speed at which said seal is slid in said first operation.

13. An apparatus according to claim 12, wherein said shaft comprises a cylindrical portion and a non-cylindrical portion, and said controlling means controls the second and third operations to be performed at said cylindrical portion of said shaft.

14. An apparatus according to claim 12, wherein said shaft comprises a cylindrical portion and a non-cylindrical portion, and said controlling means controls the second and third operations to be performed at said cylindrical portion of said shaft.

15. An apparatus according to claim 12, wherein said controlling means controls said seal to be slid onto said shaft while rotating said shaft in said third operation.

16. An apparatus for inserting a seal onto a shaft, said seal including an opening formed in a substantially same shape as an outer periphery of said shaft and contacting to said shaft, said seal further including a front end, which contacts to said shaft, being formed to be thin along an axial direction of said shaft, said apparatus comprising:

first means for curling at least a part of said front end when said seal is slid onto said shaft;

second means for straightening a curl of said front end formed by said first means in such a way that said seal is positioned at a cut portion formed in an outer circumferential surface of said shaft and, at the same time, said shaft and said seal are rotated relatively with each other; and third means for situating said seal said front end of which has been uncurled at a predetermined position.

17. An apparatus according to claim 16, wherein a minimum diameter of said shaft at said cut portion is smaller than an inner diameter of said front end.

18. An apparatus according to claim 16, wherein said second means rotates said inserting means.

19. An apparatus according to claim 16, wherein said second means rotates said seal.

20. An apparatus according to claim 16, wherein said second means rotates both said shaft and said seal.

21. An apparatus according to claim 20, wherein said second means rotates said shaft and said seal in opposite directions with respect to each other.

22. An apparatus according to claim 16, wherein said cut portion has a flat cut surface.

23. An apparatus according to claim 16, wherein said cut portion has a cylindrical convex cut surface.

24. An apparatus according to claim 16, wherein said cut portion has a cylindrical concave cut surface.

25. An apparatus according to claim 16, wherein said cut portion has a groove-like cut surface.

26. An apparatus according to claim 16, wherein said cut portion is formed on one side of said shaft, and another cut portion is formed on the other side of said shaft with a central axis of said shaft between them.

27. An apparatus according to claim 16, wherein an inclined surface is formed in a step portion between the outer circumferential surface of said shaft and said cut portion, and said third means moves said seal whose front end has been uncurled from said cut portion to a predetermined position by utilizing said inclined surface.

28. A seal-sliding apparatus for positioning a seal with a lip onto a shaft having a circumferential groove formed in an outer surface thereof, comprising:
   means for positioning said seal at the circumferential groove of said shaft in order to uncurl said lip of said seal to an initial sealing shape; and
   lip uncurling means for rotating at least one of said seal and said shaft in order to ensure that said lip is uncurled to the initial sealing shape.

29. A seal-sliding apparatus according to claim 28, wherein a minimum diameter of said shaft at said circumferential groove is smaller than an inner diameter of said lip, and a width of said circumferential groove is larger than a projecting height of said lip.

30. A seal-sliding apparatus according to claim 28, wherein said lip uncurling means rotates said shaft and said seal relatively with each other when said seal is at said circumferential groove.

31. A seal-sliding apparatus according to claim 30, wherein said lip uncurling means rotates said shaft and said seal in opposite directions with respect to each other.

32. A seal-sliding apparatus for positioning a seal with a lip onto a shaft, comprising:
   a jig member combined coaxially to a central axis of said shaft and having a cut portion formed in an outer circumferential surface thereof; and
   lip uncurling means for positioning said seal adjacent to said cut portion of said jig and for rotating said jig member and said seal relatively with each other in order to ensure that said lip of said seal is uncurled to an initial sealing shape.

33. A seal-sliding apparatus according to claim 32, wherein a minimum diameter of said jig member at said cut portion is smaller than an inner diameter of said lip.

34. A seal-sliding apparatus according to claim 32, wherein said lip uncurling means rotates said jig member.

35. A seal-sliding apparatus according to claim 32, wherein said lip uncurling means rotates said seal.

36. A seal-sliding apparatus according to claim 32, wherein said lip uncurling means rotates both said jig member and said seal.

37. A seal-sliding apparatus according to claim 36, wherein said lip uncurling means rotates said jig member and said seal in opposite directions with respect to each other.

38. A seal-sliding apparatus according to claim 32, wherein said cut portion of said jig member has a flat cut surface.

39. A seal-sliding apparatus according to claim 32, wherein said cut portion of said jig member has a cylindrical convex cut surface.

40. A seal-sliding apparatus according to claim 32, wherein said cut portion of said jig member has a cylindrical concave cut surface.

41. A seal-sliding apparatus according to claim 32, wherein said cut portion of said jig member has a groove-like cut surface.

42. A seal-sliding apparatus according to one of claims 38 to 41, wherein said cut portion is formed on both sides of said jig member with a central axis of said jig member therebetween.

43. A seal-sliding apparatus according, to one of claims 38 to 41, wherein an inclined surface is formed in a step portion between an outer circumferential surface and the cut surface of said jig member.

44. A seal-sliding apparatus for positioning a seal with a lip onto a shaft, comprising:
   a jig member combined coaxially to a central axis of said shaft and having a circumferential groove formed in an outer circumferential surface thereof; and
   lip uncurling means for positioning said seal adjacent to said circumferential groove of said jig and for rotating said jig member and said seal relatively with each other in order to ensure that said lip of said seal is uncurled to an initial sealing shape.

45. A seal-sliding apparatus according to claim 44, wherein a minimum diameter of said jig member at said circumferential groove is smaller than an inner diameter of said lip, and a width of said circumferential groove is larger than a projecting height of said lip.

46. A seal-sliding apparatus according to claim 44, wherein said lip uncurling means rotates said jig member and said seal relatively with each other when said seal is at said circumferential groove.

47. A seal-sliding apparatus according to claim 46, wherein said lip uncurling means rotates said jig member.

48. A seal-sliding apparatus according to claim 46, wherein said lip uncurling means rotates said seal.

49. A seal-sliding apparatus according to claim 46, wherein said lip uncurling means rotates both said jig member and said seal.

50. A seal-sliding apparatus according to claim 49, wherein said lip uncurling means rotates said jig member and said in opposite directions with respect to each other.

51. A seal-sliding apparatus according to claim 32 to 44, wherein said jig member is removed from said shaft after a lip uncurling operation is completed.

* * * * *